(12) United States Patent
Ito et al.

(10) Patent No.: US 7,465,106 B2
(45) Date of Patent: Dec. 16, 2008

(54) OPTICAL RECEPTACLE

(75) Inventors: Hiroki Ito, Tokyo (JP); Tsuyoshi Tanaka, Kitami (JP); Toshiyuki Matsumoto, Kitami (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 10/560,569

(22) PCT Filed: Jun. 28, 2004

(86) PCT No.: PCT/JP2004/009451

§ 371 (c)(1),
(2), (4) Date: Dec. 12, 2005

(87) PCT Pub. No.: WO2005/001534

PCT Pub. Date: Jan. 6, 2005

(65) Prior Publication Data

US 2006/0274998 A1     Dec. 7, 2006

(30) Foreign Application Priority Data

Jun. 26, 2003  (JP) .............................. 2003-182586
Aug. 26, 2003  (JP) .............................. 2003-301100
Sep. 24, 2003  (JP) .............................. 2003-332307

(51) Int. Cl.
  *G02B 6/36* (2006.01)
(52) U.S. Cl. .............................. 385/92; 385/60; 385/78; 385/81; 385/82; 385/83; 385/84; 385/85; 385/86; 385/87; 385/88; 385/93; 385/94; 385/95; 385/97

(58) Field of Classification Search ............... 385/55, 385/15, 25, 53, 72–73, 78, 85, 92, 86, 87, 385/88, 93, 94, 95, 97
See application file for complete search history.

(56) References Cited

U.S. PATENT DOCUMENTS

| 6,186,671 | B1 * | 2/2001 | Rucks et al. ................... 385/81 |
| 7,059,780 | B2 * | 6/2006 | Yamabayashi et al. ......... 385/88 |
| 2004/0076384 | A1 * | 4/2004 | Kato et al. ..................... 385/92 |
| 2005/0286839 | A1 * | 12/2005 | Yoshikawa .................... 385/92 |

FOREIGN PATENT DOCUMENTS

JP           05-088047         4/1993

(Continued)

OTHER PUBLICATIONS

Japanese office action and its English translation for corresponding Japanese application No. 2003-332307 provides additional comments to the relevance of JP10-332998.

*Primary Examiner*—Brian Healy
*Assistant Examiner*—Hung Lam
(74) *Attorney, Agent, or Firm*—Hogan & Hartson LLP

(57) ABSTRACT

An optical receptacle includes: a fiber stub having a ferrule and an optical fiber in a through-hole of the ferrule; a holder to which an rear end of the fiber stub is fixed; and a sleeve for holding a plug ferrule in front of the fiber stub; wherein a grip ring is provided on an outer side face in which the fiber stub and the sleeve are overlapped to each other, whereby attaining the shortened optical receptacle, and improving connection loss due to tilting of the plug ferrule, and obtaining good repeatability of the connection loss.

8 Claims, 19 Drawing Sheets

FOREIGN PATENT DOCUMENTS

| | | |
|---|---|---|
| JP | 07-023305 | 1/1995 |
| JP | 8-037461 | 2/1996 |
| JP | 09-145966 | 6/1997 |
| JP | 10-332988 | 12/1998 |
| JP | 11-240741 | 9/1999 |
| JP | 2001-066468 | 3/2001 |
| JP | 2003-043313 | 2/2003 |
| JP | 2003-139994 | 5/2003 |

* cited by examiner

OPTICAL RECEPTACLE

TECHNICAL FIELD

The present invention relates to an optical receptacle usable for an optical communication module or the like.

BACKGROUND

An optical module for converting optical signals into electric signals has a structure in which an optical device, such as semiconductor laser or photo diode, is accommodated in a case, to transmit or receive the optical signals through an optical fiber (Japanese Patent Unexamined Publications (kokai) JP-11-240741-A (1999), JP-2001-66468-A (2001)).

Among the above optical modules, a receptacle type of optical module for coupling with a connector includes an optical device 20 at the rear of an optical receptacle 70 as shown in FIG. 14, and can be connected with a plug ferrule PF of an optical connector (SC connector) in front thereof.

The above optical receptacle 70, as shown in FIG. 14, includes a fiber stub 81, a sleeve 84, a holder 85 and a sleeve case 86, in which the ferrule 82 is formed of ceramic materials, such as zirconia or alumina, and an optical fiber 83 formed of silica glass or the like is inserted and fixed in a through-hole of the ferrule 82 to obtain the fiber stub 81, and a rear end 97 of the fiber stub 81 is pressed and fixed into the holder 85, and a front end 98 thereof is inserted into an internal hole of the sleeve 84, and these are pressed or fixed with an adhesive into the sleeve case 86.

Recently, a downsized optical module is required in demand for high density assembly, and an overall length of an optical receptacle is also required to be shortened. Therefore, as shown in FIG. 15, devised is another optical receptacle 71 including: the fiber stub 81 in which the optical fiber 83 is inserted and fixed in the through-hole of the ferrule 82; the sleeve 84 for holding the plug ferrule PF connectable to the front end 98 of the fiber stub 81; and a grip ring 94 for binding free deformation of the sleeve 84, being pressed onto an outer side face 99, shown by L3, adjoining the rear end 97 of the sleeve 84. Since the grip ring 94 is pressed onto the outer side face 99 of the sleeve 84 which holds the fiber stub 81 to restrict free deformation of the sleeve 84, holding force sufficient for the fiber stub 81 can be attained even when shortening the length L2 defined as the fiber stub 81 being held by the sleeve 84 (JP-10-332988-A (1998)).

In addition, as shown in FIG. 16, further devised is another structure in which the grip ring 94 shown in FIG. 15 has a stopper portion 94a to prevent the fiber stub 81 from dropping out (JP-2003-43313-A (2003)).

As shown in FIG. 16, in a case of an optical module using the above-mentioned optical receptacle 72, a case 22 containing an optical device 20 and a lens 21 is joined by welding on the side of the rear end 97 of the fiber stub 81 of the optical receptacle 72, and the plug ferrule PF is inserted into the sleeve 84 from the front side of the optical receptacle 72 to make the optical fibers contact with each other, thereby enabling communication of optical signals.

In this case, the plug ferrule PF has an outer diameter of approximately 2.5 mmΦ for connection of SC connector, or approximately 1.25 mmΦ for connection of LC connector, with tolerance in outer diameter of ±1 μm or below, and the optical fiber provided in the through-hole thereof has an outer diameter of approximately 125 μm with tolerance in outer diameter of ±1 μm as defined by JIS (Japanese Industrial Standards) or IEC (International Electorotechnical Commission) standard. Conventionally, each of components, e.g., sleeve 84, plug ferrule PF, is machined with high accuracy in order to connect cores (not shown) for transmitting optical signals to each other with low loss, the core having a disameter of approximately 10 μm, being formed in the center of the optical fiber. The sleeve 84 can hold the fiber stub 81 and the plug ferrule PF with high stability and accuracy.

Further, the front end 98 of the above fiber stub 81 is mirror finished into a curved face with a curvature radius of approximately 5 to 30 mm to reduce connection loss in contact. The rear end 97 is mirror finished with the end face tilted at approximately 4 to 10 degree together with the ferrule 82 into which the optical fiber 83 is inserted, thereby suppressing reflecting light, that is, light emitted from the optical device 20, such as laser diode, may not come back to the optical device.

In the conventional optical receptacle 72 as shown in FIG. 14, however, when adopting a technique of shortening the length L1 of the sleeve 84 and the distance L2 of front end 98 of the fiber stub 81 to respond demands of downsizing, the holding force between the sleeve 84 and the fiber stub 81 is remarkably reduced. Consequently, in a case the plug ferrule PF is loaded as tilted during connection of the plug ferrule PF to the fiber stub 81, the sleeve 84 may be also tilted, causing connection loss.

Moreover, when changing in dimension from a 2.5 mmΦ ferrule of SC connector to a 1.25 mmΦ ferrule of LC connector, the outer area of the ferrule is reduced half because of the decreased outer diameter of the ferrule. Consequently, in a case of adopting such a technique for fixing a fiber stub as the conventional technique, for example, adopting relation among the length L3 defined as the fiber stub being fixed in the holder, the outer diameter D of the fiber stub 81 and the inner diameter D1 of a fiber stub fixed portion of the holder 85, a contact area between the holder 85 and the fiber stub 81 is remarkably reduced with the fixing force significantly lowered, thereby degrading repeatability in connection loss due to motion of the fiber stub 81 during connection of optical connectors.

Furthermore, in the optical receptacles 71 and 72 as shown in FIGS. 15 and 16, even when the plug ferrule PF is loaded as tilted after the plug ferrule PF is connected to the fiber stub 81 by pressing the grip ring 94 onto the sleeve 84, it may be imagined that the sleeve 84 is hardly tilted with no connection loss. But since a load is applied to the fiber stub due to repetition of attachment and detachment of the plug ferrule PF or by a continuing spring load of the plug ferrule PF during connection, the grip ring 94 is required to effect a sufficient grip force on the fiber stub 81 and the sleeve 84, and a sufficient fixing force on the holder 85. Therefore, the sleeve 84 may be deformed or unevenly deformed during the plug ferrule PF is inserted in or extracted from the sleeve 84, resulting in unstable insertion or extraction force. These structures are not suitable for usage of attaching great importance to repeatability of attachment and detachment.

Further, the sleeve 84 may be cracked or distorted by strongly pressing in because of thin shape. In such a structure with no stopper as the grip ring 94 in FIG. 15, the grip force for tightly fixing by pressing to prevent the fiber stub 81 from dropping out must be minutely controlled.

Furthermore, since the length L2 defined as the fiber stub 81 being held by the sleeve 84 is shortened, the holding condition of the fiber stub 81 becomes unstable. Therefore, the holding condition of the fiber stub 81 by the sleeve 84 may be changed every time the plug ferrule PF becomes contact, thereby degrading repeatability of connection loss.

Recently, characteristics of variation of insertion loss and variation of reflection attenuation (wiggle characteristics)

versus load applied to the plug ferrule PF perpendicularly to the optical axis thereof have been made much account of. If the length L2 defined as the fiber stub 81 being held by the sleeve 84 is shortened, the wiggle characteristics is worsened.

Further, because of the unstable holding condition, the connection portions of the optical fibers may slip mutually, causing scratches on the end face of the optical fiber 83, thereby disabling reception and transmission of optical signals.

Meanwhile, another optical receptacle in which a sleeve is integrated with a sleeve case, as shown in FIG. 17, is also known (JP-8-37461-A (1996)).

The optical receptacle 74 shown in FIG. 17 is configured of the sleeve 84 integrally formed by cutting a parent material of stainless steel or injection molding, and a ferrule stopper 93 is pressed into the cylindrical inner face.

Incidentally, in an optical receptacle requiring highly effective optical coupling with a single mode optical fiber, positioning with high accuracy is demanded even if a plug ferrule is repeatedly attached and detached. Therefore, the above-mentioned optical receptacle 74 is provided with wear resistance by forming a higher hardness film of TiC with a thickness of 1 to 10 μm using CVD, on the inner face of the sleeve 84 of stainless steel, into which the plug ferrule PF is inserted. Moreover, another optical receptacle requiring high accurate positioning and wear resistance may be made of a ceramic sleeve with wear resistance, which can be machined accurately.

As downsizing of transmitters and receivers for optical communications, generally used are optical receptacle type of optical fibers adaptable with double-core type of optical connectors having a pair for transmission and reception. Smaller optical modules are also required, and the optical modules in the transmitters and receivers for optical communications must be positioned adjacently so as to adapt to a pitch of the double-core optical connector.

As a result, in case of an optical receptacle 74T for transmitting and an optical receptacle 74R for receiving are fixed together in a metal housing 25, as shown in FIG. 18, electric signals for driving a light emitting device 20T may leaked out through the metallic optical receptacle 74T, causing noise on a light receiving device 20R, thereby degrading sensitivity for receiving.

Additionally, since electromagnetic waves may be generated by an antenna composed of the metal sleeve of the optical receptacle 74T for transmitting, a metallic shield cover must be disposed on the periphery of the transmitter and receiver for optical communications to prevent leakage of electromagnetic waves. Also, the metal sleeve of the optical receptacle 74R for receiving may pick up an external noise, thereby degrading sensitivity for receiving. Noise characteristics thereof must be improved.

DISCLOSURE OF THE INVENTION

An optical receptacle according to the present invention includes: a fiber stub having a ferrule and an optical fiber in a through-hole of the ferrule; a holder to which an rear end of the fiber stub is fixed; and a sleeve for holding a plug ferrule in front of the fiber stub; wherein a grip ring is provided on an outer side face in which the fiber stub and the sleeve are overlapped to each other.

It is preferable in the present invention that the grip ring is an elastic body.

Further, it is preferable in the present invention that the grip ring is fixed to the holder.

In the optical receptacle according to the present invention, the optical fiber is inserted and fixed in the through-hole of the ferrule, and the rear end of the ferrule is fixed to the holder with a distance L3, and the sleeve for holding the plug ferrule in front of the fiber stub also holds the fiber stub, and the grip ring is provided on the outer face of the sleeve with a distance L4, thereby preventing the sleeve from tilting even when a distance L2 in which the fiber stub and the sleeve are overlapped to each other is shorter than half of a length L1 of the sleeve. Consequently, a robust structure against a tilting load on the plug ferrule can be obtained to attain a small optical receptacle.

Further, since the grip ring may be an elastic body, the sleeve is hardly deformed even when the sleeve is also an elastic body. Consequently, there is no problem of making insertion force or extraction force unstable and worsening attachment and detachment due to deformation of the sleeve when inserting or extracting the plug ferrule.

Furthermore, another optical receptacle according to the present invention includes: a fiber stub having a ferrule and an optical fiber in a through-hole of the ferrule; a holder to which an rear end of the fiber stub is fixed; and a sleeve for holding a plug ferrule connectable with a front face of the fiber stub, the sleeve being holding a front end of the fiber stub; wherein a thicker portion is formed at an end of the sleeve, and the fiber stub is inserted on the side of the thicker portion. Therefore, holding force per unit length on the side of the fiber stub is increased, and no stress is externally applied to the sleeve other than a stress due to insertion of the fiber stub.

It is preferable in the present invention that a tier length of a portion with a larger outer diameter of the sleeve is shorter than an insertion length of the fiber stub into the sleeve.

Further, it is preferable in the present invention that the fiber stub is fixed to the holder using adhesives or combination of press insertion and adhesives.

Further, it is preferable in the present invention that chamfer or radius of a corner of the fiber stub on the insertion side of the plug ferrule is 0.1 mm or below.

In the optical receptacle according to the present invention, the optical fiber is inserted and fixed in the through-hole of the ferrule, and the rear end of the ferrule is fixed to the holder, and the sleeve for holding the plug ferrule connectable with the front face of the fiber stub in front of the fiber stub also holds the front end of the fiber stub, the thicker portion is formed at the end of the sleeve, and the fiber stub is inserted on the side of the thicker portion. Therefore, holding force per unit length on the side of the fiber stub is increased, and chamfer or radius of a corner of the fiber stub on the insertion side of the plug ferrule is controlled to 0.1 mm or below, and no stress is externally applied to the sleeve other than a stress due to insertion of the fiber stub. Consequently, the fiber stub can be held stably even when the portion of the fiber stub held by the sleeve is shorter. And the condition of the fiber stub 3 held by the sleeve 4 does not change every time the plug ferrule is connected, thereby obtaining good repeatability of connection loss. In addition, because of the stable holding condition, the connection portions of the optical fibers hardly slip mutually, causing no scratch on the end face of the optical fiber, thereby improving reliability in receiving and transmitting optical signals.

Further, yet another optical receptacle according to the present invention includes: a ceramic precision sleeve for holding a plug ferrule, wherein a metal holder is provided at a rear end of the precision sleeve, and a flange which is electrically insulated from the metal holder is provided on an outer face of the precision sleeve.

It is preferable in the present invention that a tier portion is formed on the outer face of the precision sleeve, and the flange is fixed to the precision sleeve in contact with the tier portion.

Further, it is preferable in the present invention that the flange is made of an electric insulation material.

Further, it is preferable in the present invention that the flange is fixed to the metal holder via a spacer made of an electric insulation material.

Further, it is preferable in the present invention that a stub, which includes a ceramic ferrule of the same material as the precision sleeve and an optical fiber being inserted and held in the ferrule, is pressed and fixed into the precision sleeve.

According to the present invention, there is no problem that, in case of both an optical receptacle for transmitting and an optical receptacle for receiving are fixed together in a metal housing, electric signals for driving a transmitting optical module may leaked out through the metallic optical receptacle to the metal housing, causing noise on a receiving optical module, and, electromagnetic waves may be generated by an antenna composed of the metal sleeve 1 for transmitting, and the metal sleeve for receiving may pick up an external noise, thereby degrading sensitivity for receiving. Consequently, the small optical receptacle with excellent noise characteristics, good wear resistance, more precise positioning and excellent lateral loading characteristics can be obtained.

BEST EMBODIMENT FOR CARRYING OUT THE INVENTION

Several embodiments according to the present invention will be described below with reference to drawings.

First Embodiment

Figure 1A:
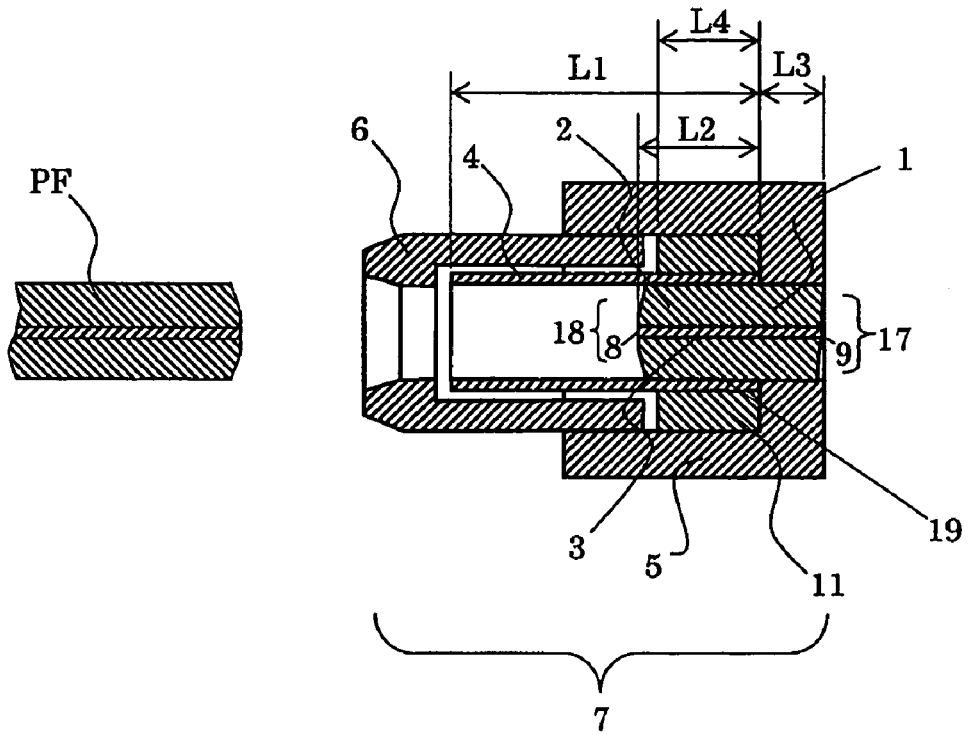
FIG. 1A is a cross-sectional view showing a first embodiment according to the present invention.

FIG. 1A is a cross-sectional view showing a first embodiment according to the present invention, including a fiber stub 1 having a ferrule 2 and an optical fiber 3 inserted and fixed in a through-hole of the ferrule 2; a holder 5 to which an rear end 17 of the fiber stub 1 is fixed; a sleeve case 6; and a sleeve 4 for holding a plug ferrule PF connectable with an front end 18 of the fiber stub 1; wherein the sleeve 4 is inserted and held on the front end 18 of the fiber stub 1.

And then, a resin is filled on an outer side face 19 where the sleeve 4 and the fiber stub 1 are overlapped to each other, thereby forming a grip ring 11 for preventing the sleeve 4 from tilting. And since the grip ring 11 is an elastic body, the sleeve 4 is hardly deformed or tilted.

Hereinafter, a length L1 of the sleeve 4, an overlapping length L2 of the sleeve 4 and the fiber stub 1, an overlapping length L3 of the holder 5 and the fiber stub 1, and an overlapping length L4 of the fiber stub 1 and the grip ring 11 are defined, respectively.

Since the grip ring 11 is provided on the outer face of the sleeve 4 in a range of the length L4, there is little possibility that the sleeve 4 is immediately deformed or tilted, even when the overlapping length L2 of the sleeve 4 and the fiber stub 1 is equal to or shorter than half of the length L1 of the sleeve. The length L2 is preferably equal to or longer than one-third of the length L1.

A material for the sleeve 4 may be an elastic body, such as stainless steel, copper, iron, nickel, plastics or others.

For the grip ring 11, an elastic ring made of resin or metal with a splitting slit, alternatively to filling of resin, can be fitted and fixed to the holder 5 to prevent the sleeve 4 from tilting.

Further, the sleeve case 6 can be integrated with the grip ring 11 by forming a slit in the sleeve case 6 on the insertion side of the holder.

The ferrule 2 constituting the fiber stub 1 is preferably made of metal, such as stainless steel, phosphor bronze, or plastics, such as epoxy, liquid crystal polymer, or ceramics, such as alumina, zirconia, more preferably made of zirconia ceramics. Specifically, partially stabilized zirconia ceramics which mainly has tetragonal crystals, containing a principal component of $ZrO_2$ and a stabilizing material of at least one selected out of $Y_2O_3$, CaO, MgO, $CeO_2$, and $Dy_2O_3$, is preferably used. This partially stabilized zirconia ceramics exhibits excellent wear resistance and appropriate elastic deformation, therefore, with advantages in fixing by press insertion.

For approaches of machining the ferrule 2, in a case of forming the ferrule 2 from, e.g., zirconia ceramics, a molded object to be the ferrule 2, in shape of cylinder or rectangular solid is obtained in advance using a given molding method, such as injection molding, press molding, extrusion molding, and then the molded object is sintered at 1,300 to 1,500 degree-C., followed by cutting or grinding it to predetermined dimensions. Incidentally, the molded object may be cut to predetermined dimensions before sintering.

An end face 8 of the front end 18 of the fiber stub 1 is machined in a curved shape with a radius of curvature of approximately 5 to 30 mm to reduce connection loss with an optical connector. An end face 9 of the rear end 17 is mirror finished with a tilted face having approximately 4 to 10 degree to suppress reflected light which has been emitted from the optical device, such as LD, and then reflected by the end face of the optical fiber 3, and then returned to the optical device 20.

In addition, the sleeve 4 is made of zirconia, alumina, copper or others, typically ceramics, such as zirconia, mainly in light of wear resistance. For approaches of machining it, in a case of forming the sleeve 4 from, e.g., ceramics, such as zirconia, a molded object to be the sleeve 4, in shape of cylinder hollow or solid is obtained in advance using a given molding method, such as injection molding, press molding, extrusion molding, and then the molded object is sintered at 1,300 to 1,500 degree-C., followed by cutting or grinding it to predetermined dimensions.

Further, surface roughness of the inner face of the sleeve 4 is, in light of insertion, preferably 0.2 μm or below in arithmetic mean roughness (Ra). Tolerances between the outer diameter of the fiber stub 1 and the inner diameter of the sleeve 4 is preferably ±1 μm or below to attain lower connection loss. The inner diameter of the sleeve 4 is preferably designed so as to attain insertion force of 0.98 N or more to hold securely the fiber stub 1.

Since the fiber stub 1 is loaded due to repetition of attachment and detachment of the plug ferrule PF or a continuing spring load of the plug ferrule PF during connection, it requires a sufficient fixing strength. This can be realized by approaches for fixing the fiber stub 1 to the holder 5 using sufficient press insertion, or adhesives, or combination of press insertion and adhesives.

Further, the holder 5 is typically welded with a case 22 (See FIG. 15) for an optical module. Therefore, it is made of a weldable material, such as stainless steel, copper, iron, nickel, in particular, stainless steel in light of corrosion resistance and weldability.

Furthermore, the sleeve case 6 can be made of broad variety of materials, such as stainless steel, copper, iron, nickel, plastics, zirconia, alumina, because of no need for wear resistance and weldability.

In such an optical receptacle 7 according to the present invention, since the sleeve 4 is held by the elastic body, it is not subject to extreme stress and hardly tilted, resulting in fine attachability and detachability during insertion and extraction of the plug ferrule PF into the sleeve 4. Additionally, insertion length of the plug ferrule PF into the sleeve 4 can be shortened to downsize the whole length. The fiber stub 1 can be also securely fixed directly to the holder 5 using press insertion or adhesives, thereby preventing the fiber stub 1 from misaligning due to a pressing load during attachment and detachment of the plug ferrule PF.

Next, specific examples according to the present embodiment will be described.

First, for an example, the optical receptacle 7 shown in FIG. 1A was assembled, where an LC connecter was used as an optical connector for the optical receptacle 7.

The ferrule 2 used for the fiber stub 1 was made of zirconia ceramics. The ferrule 2 with the shape shown in FIG. 1A was obtained by extrusion-molding a ceramic molded object in shape of cylinder hollow, followed by sintering and cutting it.

The optical fiber 3 was inserted and fixed into the throughhole of the resulting ferrule 2, and then the front end 18 was mirror finished to a curved face with a radius of curvature of approximately 20 mm. The rear end 17 opposite to the front end 18 was mirror finished with a tilted face having 8 degree, to suppress reflected light which has been emitted from the optical device 20, such as LD, and then reflected by the front face 18 of the optical fiber 3, and then returned to the optical device 20, resulting in the fiber stub 1.

The rear end 17 of the fiber stub 1 was pressed into the holder 5 using a handpress equipped with a pressure sensor while confirming a sufficient load. At this time, the press insertion load was 150 N around the fixed position of this sample. Therefore, the fiber stub 1 could not move on condition with such a load or below, and obviously attained sufficient strength against spring pressure of the plug ferrule PF and impact during attachment or detachment.

Next, the precision sleeve 4, which was made of zirconia ceramics with the inner face polished so as to have accuracy of 1 μm larger than the outer diameter of the ferrule 2, was inserted onto the fiber stub 1 which has been pressed in and fixed to the holder 5, until making contact with the holder 5.

At this time, the length L2 defined as the front end 18 of the fiber stub 1 being overlapped with the sleeve 4 was designed to be one-third of the length L1 of the precision sleeve 4 for shortening the receptacle. Then, a resin was filled within the range of length L4 in which the precision sleeve 4 and the fiber stub 1 was overlapped to each other, followed by heat-curing it in an oven to form the grip ring 11. Finally, the sleeve case 6 was inserted into the holder 5, resulting in the optical receptacle 7 as shown in FIG. 1A.

Figure 14:
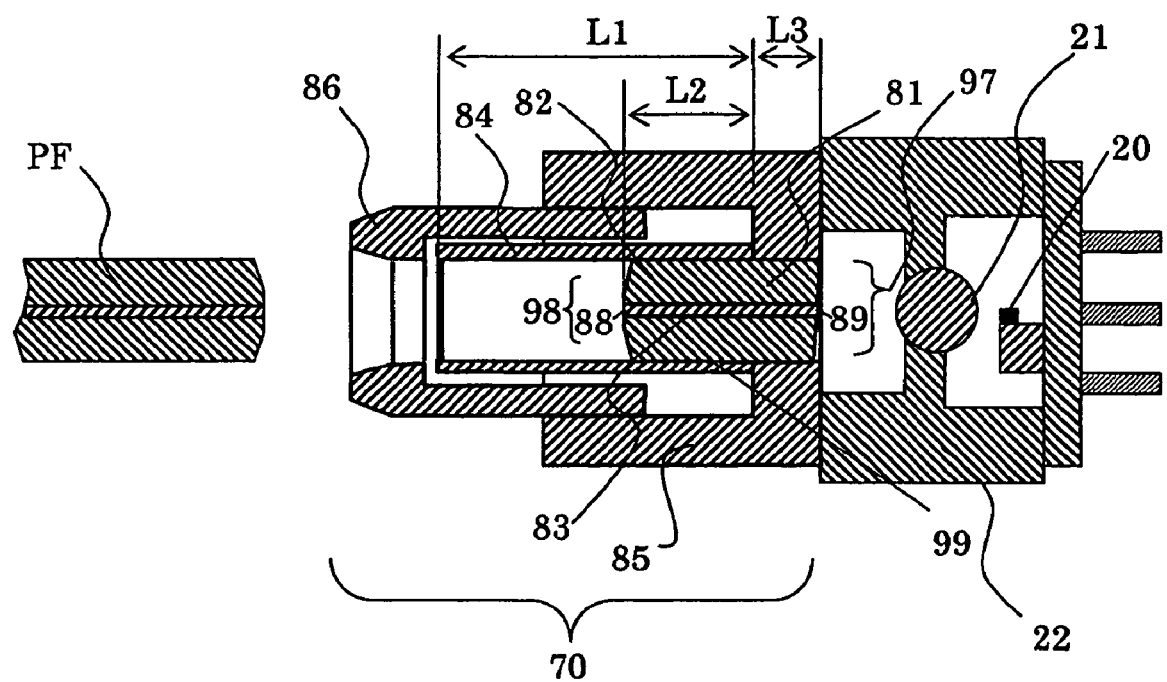
FIG. 14 is a cross-sectional view showing an example of a conventional optical receptacle.

Next, for a comparative example, the optical receptacle 70 as shown in FIG. 14 was assembled by such assembling procedures as above-described for the optical receptacle 7, excluding filling a resin for the grip ring 11, with the sleeve case 6 inserted.

Figure 2A:
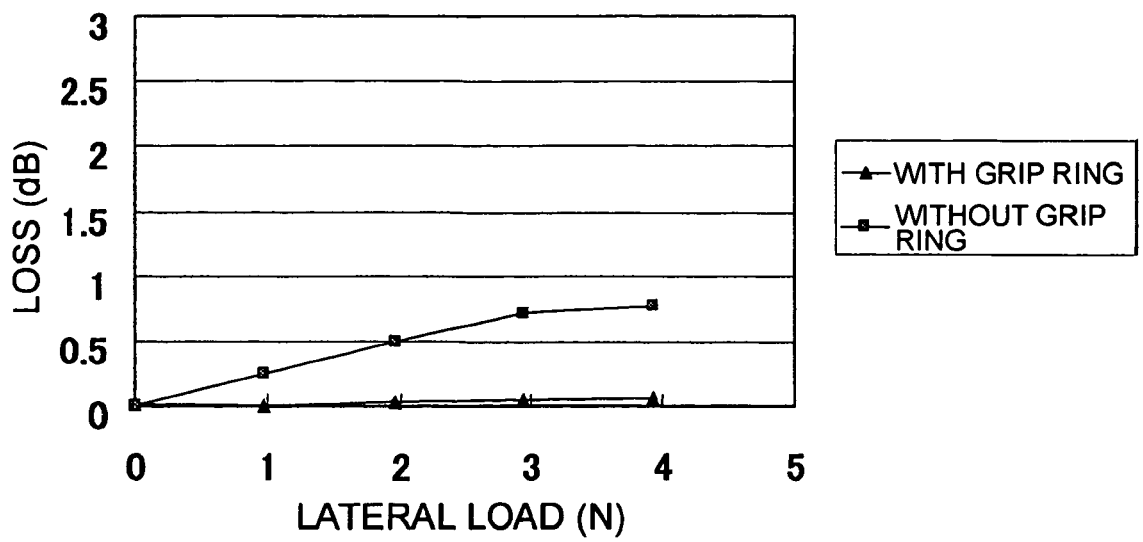
FIG. 2A is a graph showing connection loss versus lateral load in cases with and without a grip ring.
Figure 2B:
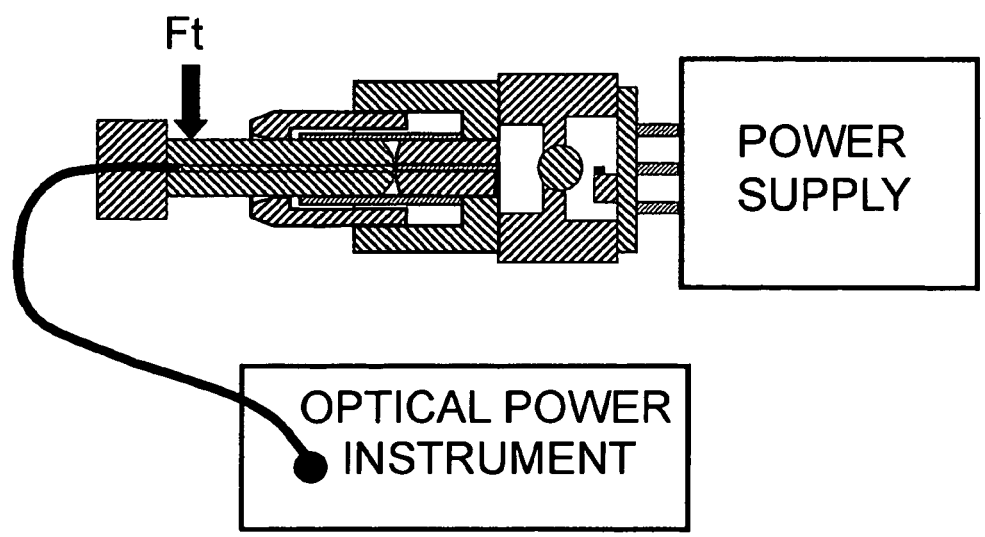
FIG. 2B is an explanatory view showing a measurement of connection loss versus lateral load.

Here, as shown in FIG. 2B, the two receptacles were provided with light emitting devices to complete modules, and then turning them on by driving a power supply. After connecting the plug ferrule PF to each of the receptacles to guide light out, optical power was measured using an optical power instrument. Next, the plug ferrule PF was loaded with a lateral force Ft, and then connection loss due to tilting was measured using the optical power instrument, followed by calculating and comparing the measurements.

Figure 1B:
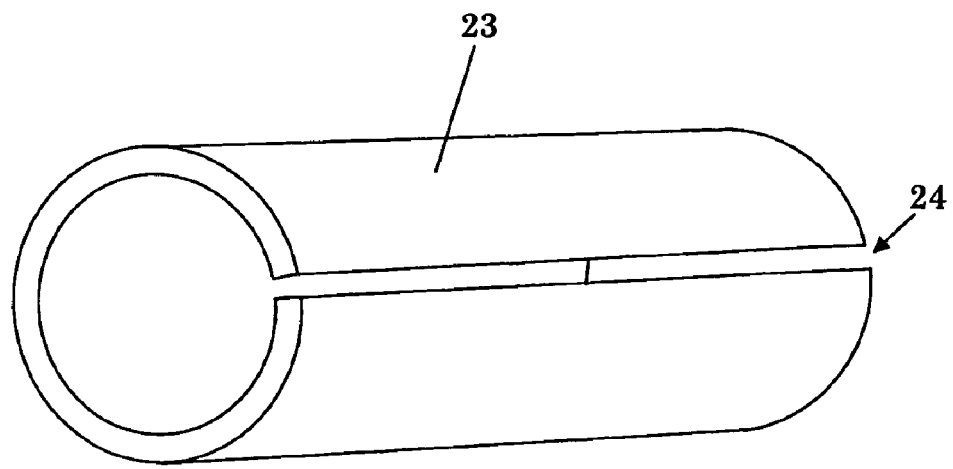
FIG. 1B is a perspective view showing an elastic deformable split sleeve with a slit.

FIG. 2 shows comparative graphs of connection loss versus lateral load. It can be seen that, from this result, tilting can be restricted by the grip ring 11, thereby suppressing the loss due to the lateral force Ft. Additionally, in case the split sleeve 23 with the slit 24, as shown in FIG. 1B, used for the sleeve 4 which can be elastically deformed, the grip ring 11 is made of an elastic body which does not constrict extremely the split sleeve 23 with the slit 24, so that the sleeve 23 may not be loaded with large stress or deformed to keep an effect on oblique tilting of the plug ferrule PF.

Second Embodiment

Figure 3:
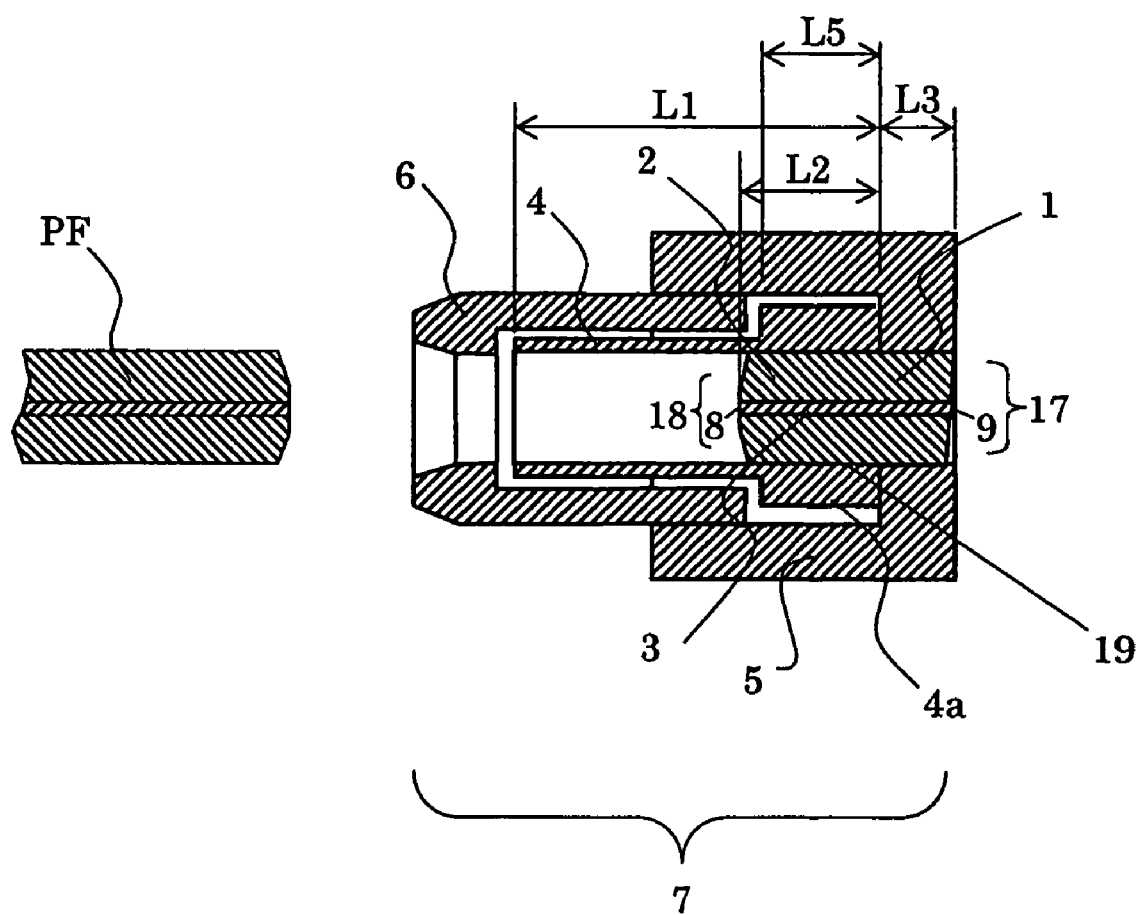
FIG. 3 is a cross-sectional view showing a second embodiment according to the present invention.

FIG. 3 is a cross-sectional view showing a second embodiment according to the present invention, including a fiber stub 1 having a ferrule 2 and an optical fiber 3 inserted and fixed in a through-hole of the ferrule 2; a holder 5 to which an rear end 17 of the fiber stub 1 is fixed; a sleeve case 6; and a sleeve 4 for holding a plug ferrule PF connectable with an front end 18 of the fiber stub 1; wherein the sleeve 4 is inserted and held on the front end 18 of the fiber stub 1.

In the sleeve 4 used herein, as shown in FIG. 3, the outer face thereof at the end portion on the insertion side of the fiber stub 1 is machined stepwise to have a thicker portion 4a, a thickness of which is larger than a thickness of the portion for holding the plug ferrule PF, thereby enhancing grip force of the thicker portion 4a.

Further, the thicker portion 4a is preferably 1.5 to 2.5 times as thick as the other portion, because if the thicker portion 4a becomes thinner than above, it cannot hold sufficiently the fiber stub, meanwhile, if thicker portion 4a becomes thicker than above, there is a possibility of breakage due to an increased stress to the sleeve 4 or causing difficulty of insertion of the plug ferrule PF.

Further, a length L5 of the thicker portion 4a is preferably within a range of $4/5$ to $1/5$ times as large as the insertion length L2 of the fiber stub 1, because if the length L5 is longer than the above range, the plug ferrule PF is hardly inserted, meanwhile, if shorter, sufficient holding force for the fiber stub cannot be obtained.

In case of the thicker portion 4a being within the above range, sufficient holding force can be obtained even when the holding portion for the fiber stub 1 is shortened, and insertion force of the plug ferrule PF can be maintained to an appropriate level.

Figure 4A:
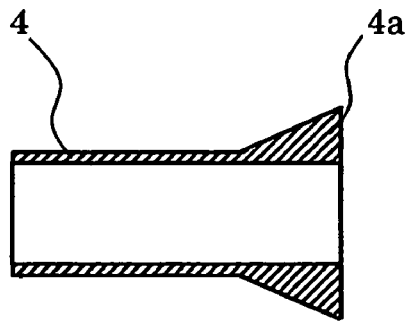
FIGS. 4A to 4C are cross-sectional views showing examples of a thicker portion of a sleeve.
Figure 4B:
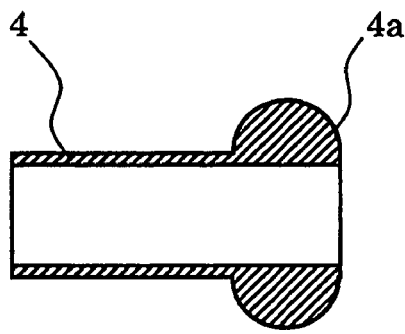
Figure 4C:
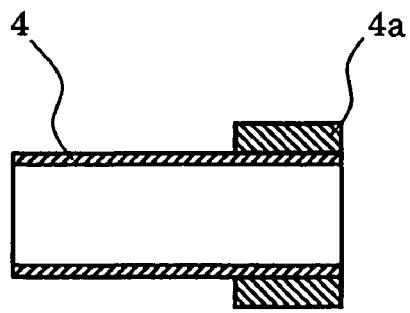

The above thicker portion 4a may be formed, in addition to the above-described shape, in a tapered shape as shown in FIG. 4A, or a curved shape as shown in FIG. 4B, or with another distinct member cladded as shown in FIG. 4C.

The ferrule 2 constituting the fiber stub 1 is preferably made of metal, such as stainless steel, phosphor bronze, or plastics, such as epoxy, liquid crystal polymer, or ceramics, such as alumina, zirconia, more preferably made of zirconia ceramics. Specifically, partially stabilized zirconia ceramics which mainly has tetragonal crystals, containing a principal component of $ZrO_2$ and a stabilizing material of at least one selected out of $Y_2O_3$, CaO, MgO, $CeO_2$, and $Dy_2O_3$, is preferably used. This partially stabilized zirconia ceramics exhibits excellent wear resistance and appropriate elastic deformation, therefore, with advantages in fixing by press insertion.

For approaches of machining the ferrule 2, in a case of forming the ferrule 2 from, e.g., zirconia ceramics, a molded object to be the ferrule 2, in shape of cylinder or rectangular solid is obtained in advance using a given molding method, such as injection molding, press molding, extrusion molding, and then the molded object is sintered at 1,300 to 1,500 degree-C., followed by cutting or grinding it to predetermined dimensions. Incidentally, the molded object may be cut to predetermined dimensions before sintering.

An end face 8 of the front end of the fiber stub 1 is machined in a curved shape with a radius of curvature of approximately 5 to 30 mm to reduce connection loss with an optical connector. An end face 9 is mirror finished with a tilted face having approximately 4 to 10 degree to suppress reflected light which has been emitted from the optical device, such as LD, and then reflected by the end face of the optical fiber 3, and then returned to the optical device. In addition, chamfer or radius of the corner on the side of the plug ferrule may be machined to 0.1 mm or below, otherwise there may be no chamfer.

In addition, the sleeve 4 is made of zirconia, alumina, copper or others, typically ceramics, such as zirconia, mainly in light of wear resistance. For approaches of machining it, in a case of forming the sleeve 4 from, e.g., ceramics, such as zirconia, a molded object to be the sleeve 4, in shape of cylinder hollow or solid is obtained in advance using a given molding method, such as injection molding, press molding, extrusion molding, and then the molded object is sintered at 1,300 to 1,500 degree-C., followed by cutting or grinding the thicker portion 4a with predetermined dimensions. Incidentally, the molded object may be cut to predetermined dimensions before sintering.

Further, surface roughness of the inner face of the sleeve 4 is, in light of insertion, preferably 0.2 μm or below in arithmetic mean roughness (Ra). Tolerances between the outer diameter of the fiber stub 1 and the inner diameter of the sleeve 4 is preferably ±1 μm or below to attain lower connection loss. The inner diameter of the sleeve 4 is preferably designed so as to attain insertion force of 0.98 N or more to hold securely the fiber stub 1.

The fiber stub 1 is fixed to the holder 5 using press insertion, or adhesives, or combination of press insertion and adhesives.

Further, the holder 5 is typically welded with a case 22 (See FIG. 15) for an optical module. Therefore, it is made of a weldable material, such as stainless steel, copper, iron, nickel, in particular, stainless steel in light of corrosion resistance and weldablity.

Furthermore, the sleeve case 6 can be made of broad variety of materials, such as stainless steel, copper, iron, nickel, plastics, zirconia, alumina, because of no need for wear resistance and weldablity. In particular, it is typically made of stainless steel similarly to the holder 5, in light of matching in thermal expansion coefficient with the holder 5 and improving reliability.

In such an optical receptacle 7 according to the present invention, since there is no grip ring for restricting free deformation of the sleeve 4, the sleeve can be freely deformed during insertion and extraction of the plug ferrule PF into the sleeve 4, and insertion force and extraction force are stabilized, resulting in fine attachability and detachability. Additionally, insertion length of the fiber stub into the sleeve can be shortened to downsize the whole length. In other words, since the sleeve on the side of fiber stub becomes thicker, a sufficient holding force of the sleeve on the side of the fiber stub can be obtained even when the insertion length of the fiber stub into the sleeve is shortened.

Further, in order to suppress variation of insertion loss and variation of reflection attenuation versus load applied to the plug ferrule perpendicularly to the optical axis thereof, chamfer or radius of the corner of the fiber stub on the side of the plug ferrule is controlled to 0.1 mm or below, thereby improving stability of wiggle characteristics.

In addition, because of the stable holding condition, the connection portions of the optical fibers hardly slip mutually, causing no scratch on the end face of the optical fiber, thereby improving reliability in receiving and transmitting optical signals.

Next, specific examples according to the present embodiment will be described.

(Experiment 1)

Figure 15:
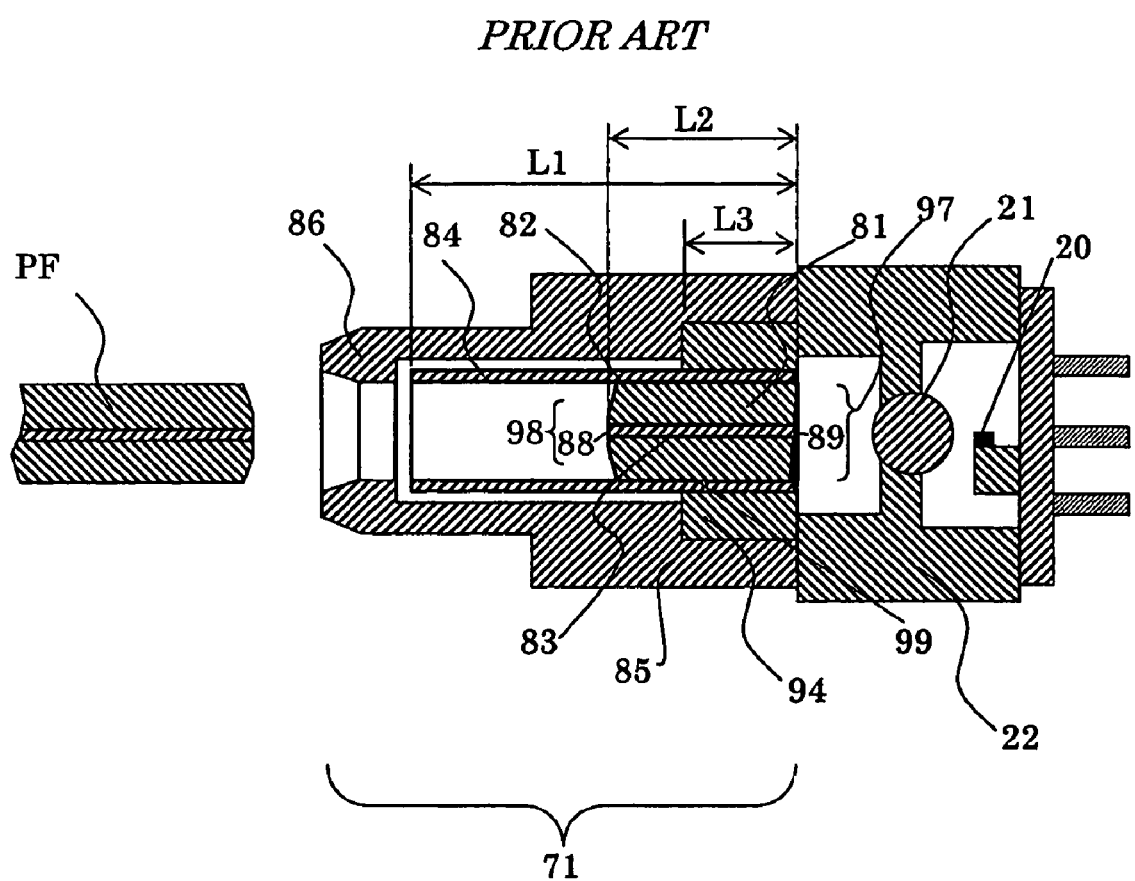
FIG. 15 is a cross-sectional view showing another example of a conventional optical receptacle.
Figure 16:
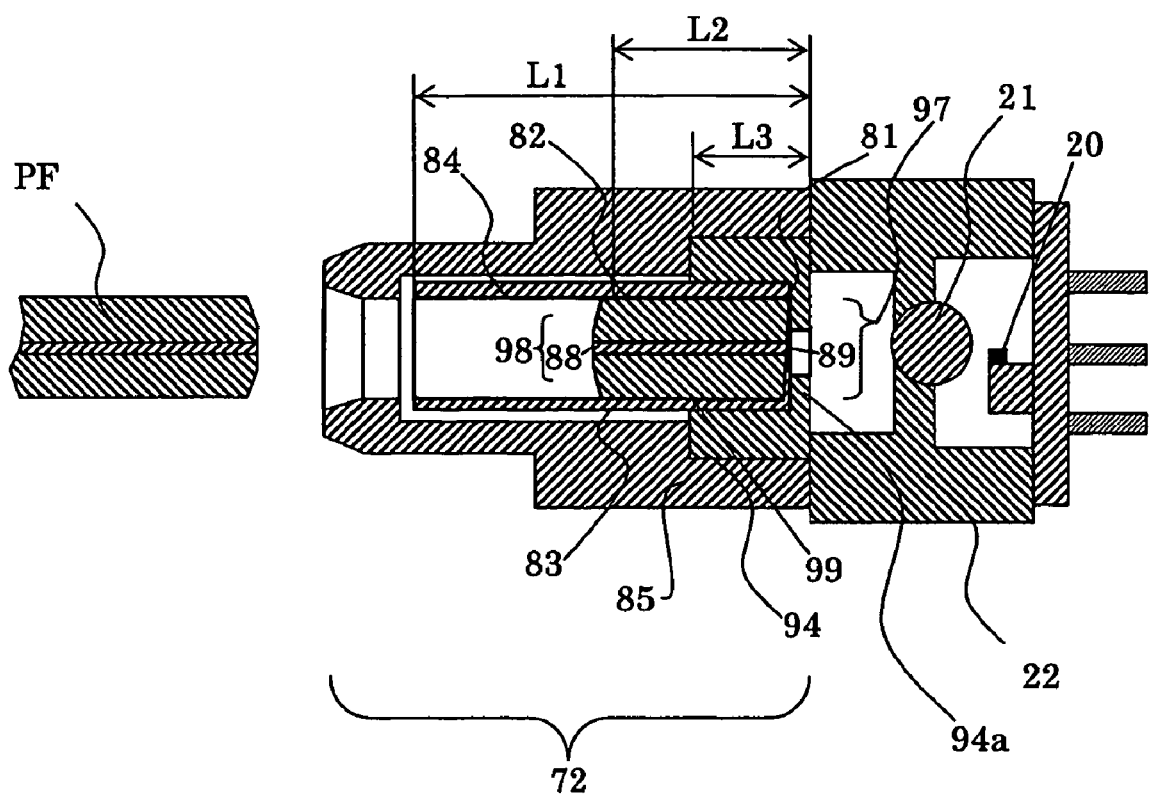
FIG. 16 is a cross-sectional view showing yet another example of a conventional optical receptacle.
Figure 17:
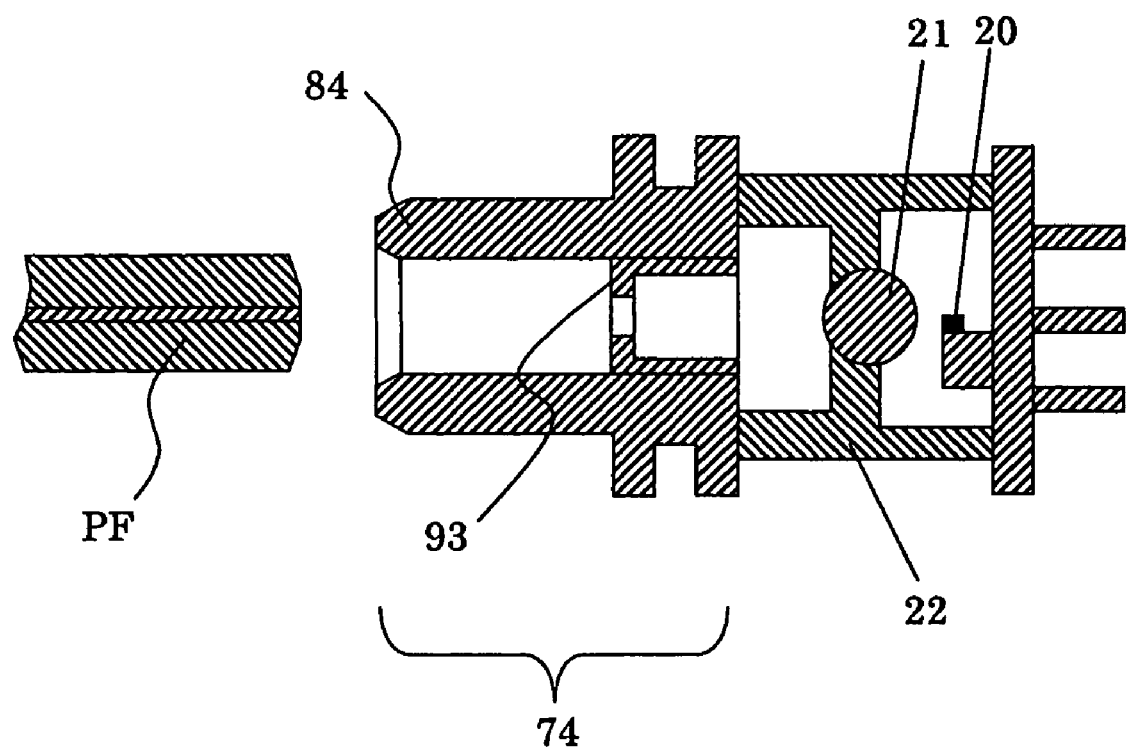
FIG. 17 is a cross-sectional view showing a conventional example of an optical receptacle in which a sleeve is integrated with a sleeve case.
Figure 18:
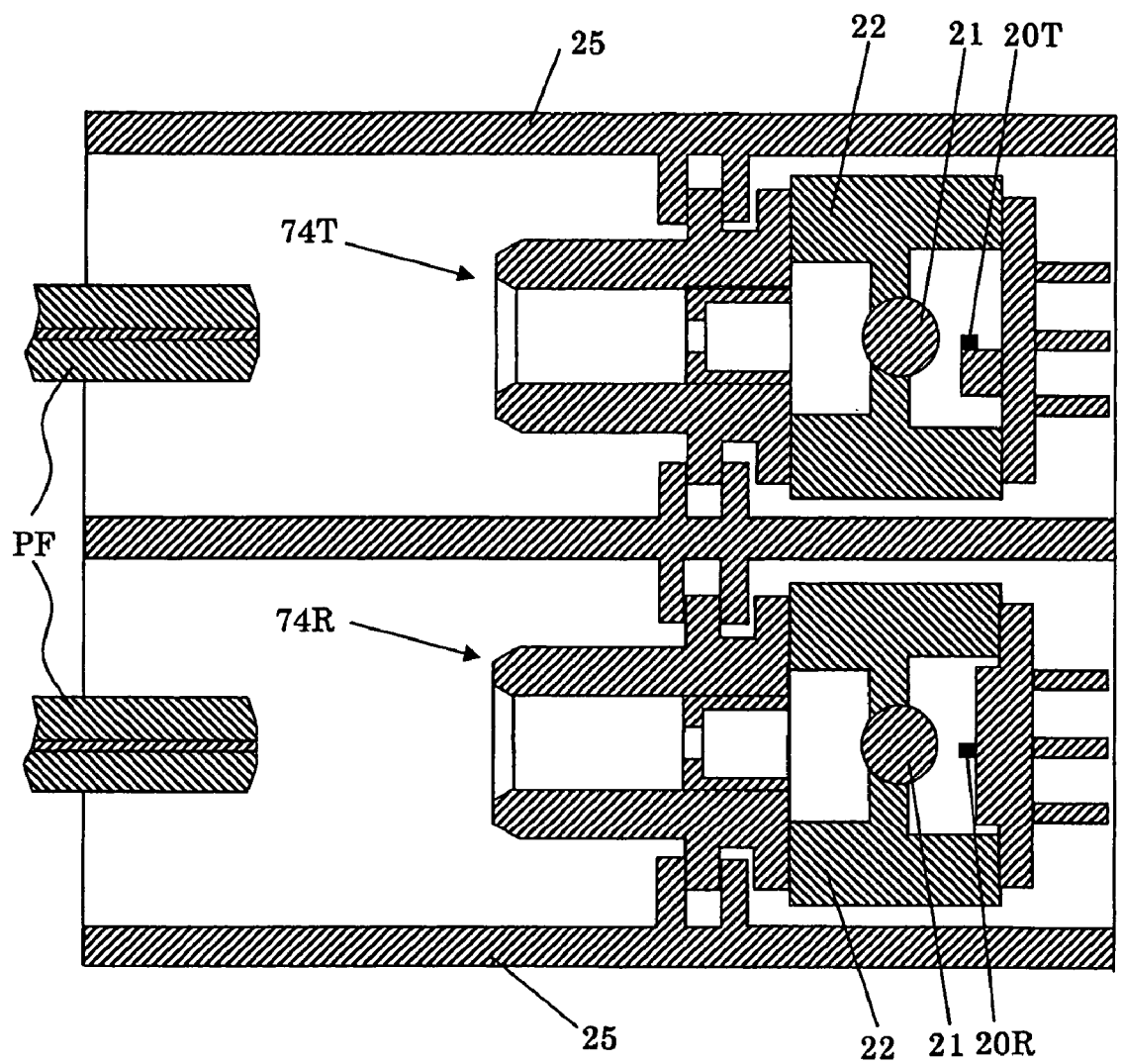
FIG. 18 is a cross-sectional view showing a conventional example of an optical receptacle for a double-core optical connectors.

First, the optical receptacle shown in FIG. 3 for an example and the optical receptacle shown in FIG. 15 for a comparative example were assembled, where an LC connecter was used as an optical connector for the optical receptacle.

The sleeve for the optical receptacle shown in FIG. 3 was formed so that the thicker portion 4a was 2 times as thick as the other portion, and the length L5 of the thicker portion 4a was ⅓ times as large as the insertion length L2 of the fiber stub 1 into the sleeve.

The ferrule used for each fiber stub was made of zirconia ceramics. One ferrule sample with the shape shown in FIG. 3 and another ferrule with the shape shown in FIG. 15 were obtained by extrusion-molding a ceramic molded object in shape of cylinder hollow, followed by sintering and cutting them.

The optical fiber was inserted and fixed into the through-hole of each of the resulting ferrules, and then the front end was mirror finished to a curved face with a radius of curvature of approximately 20 mm. The rear end opposite to the front end was mirror finished with a tilted face having 8 degree, to suppress reflected light which has been emitted from the optical device, such as LD, and then reflected by the front face of the optical fiber, and then returned to the optical device, resulting in the fiber stub.

Next, in a case of one sample, shown in FIG. 3 according to the present invention, with the front end of the resulting fiber stub inserted into the sleeve was set in a metal jig, and then the rear end of the fiber stub was pressed into the holder, resulting in one optical receptacle. In another case of another comparative sample with the resulting fiber stub inserted into the sleeve, and then a grip ring was pressed onto the outer face of the sleeve, and finally the assemble including the fiber stub, the sleeve and the grip ring was pressed into the sleeve case, resulting in another optical receptacle.

Then, after repetition of insertion and extraction of the plug ferrule of the optical connector on the front side of each of the optical receptacles, insertion and extraction force was measured using a push-pull gauge, and connection loss was measured using a power meter.

TABLE 1

|   | OPTICAL RECEPTACLE OF INVENTION | | OPTICAL RECEPTACLE OF PRIOR ART | |
|---|---|---|---|---|
|   | INSERTION AND EXTRACTION FORCE (N) | CONNECTION LOSS (dB) | INSERTION AND EXTRACTION FORCE (N) | CONNECTION LOSS (dB) |
| 1 | 1.88 | 0.03 | 2.76 | 0.31 |
| 2 | 1.90 | 0.05 | 1.95 | 0.15 |
| 3 | 1.95 | 0.07 | 2.34 | 0.20 |
| 4 | 1.94 | 0.08 | 0.84 | 0.57 |
| 5 | 2.00 | 0.04 | 1.65 | 0.04 |
| 6 | 2.03 | 0.02 | 3.89 | 0.45 |
| 7 | 2.10 | 0.07 | 1.33 | 0.02 |
| 8 | 2.00 | 0.11 | 4.15 | 0.67 |
| 9 | 1.95 | 0.10 | 2.98 | 0.42 |
| 10 | 1.97 | 0.09 | 3.31 | 0.57 |
| 11 | 2.05 | 0.12 | 1.87 | 0.09 |
| 12 | 1.99 | 0.05 | 0.91 | 0.29 |
| 13 | 2.07 | 0.02 | 2.97 | 0.44 |
| 14 | 2.06 | 0.06 | 3.25 | 0.64 |
| 15 | 2.01 | 0.04 | 3.70 | 0.59 |
| 16 | 2.00 | 0.07 | 2.31 | 0.20 |
| 17 | 1.97 | 0.02 | 1.48 | 0.10 |
| 18 | 1.98 | 0.05 | 1.12 | 0.28 |
| 19 | 1.78 | 0.10 | 2.46 | 0.33 |
| 20 | 1.88 | 0.09 | 3.78 | 0.43 |
| MEAN | 1.98 | 0.06 | 2.45 | 0.34 |
| MAX. | 2.10 | 0.12 | 4.15 | 0.67 |
| MIN. | 1.78 | 0.02 | 0.84 | 0.02 |

As seen from Table 1, the insertion and extraction force of the optical receptacle according to the present invention, was stable within a range of 1.78 to 2.10 N, and the connection loss thereof was stable within a range of 0.02 to 0.12 dB. Meanwhile, the insertion and extraction force of the conventional optical receptacle was remarkably varied within a range of 0.84 to 4.15 N and the connection loss thereof was within a range of 0.02 to 0.67 dB with bad repeatability.

(Experiment 2)

Second, the optical receptacle according to the present invention was compared with the optical receptacle shown in FIG. 14 having the same structure other than the sleeve and length of the fiber stub, in extraction force, insertion loss and variation of the insertion loss under a lateral load.

TABLE 2

|   | INSERTION AND EXTRACTION FORCE (N) | CONNECTION LOSS (dB) | VARIATION UNDER LATERAL LOAD (500 gf) (dB) |
|---|---|---|---|
| | OPTICAL RECEPTACLE OF INVENTION | | |
| 1 | 1.88 | 0.03 | 0.44 |
| 2 | 1.90 | 0.05 | 0.72 |
| 3 | 1.95 | 0.07 | 0.54 |
| 4 | 1.94 | 0.08 | 0.99 |
| 5 | 2.00 | 0.04 | 1.08 |
| | OPTICAL RECEPTACLE OF PRIOR ART IN FIG. 2 | | |
| 1 | 1.75 | 0.05 | 1.41 |
| 2 | 2.10 | 0.04 | 0.83 |
| 3 | 2.02 | 0.09 | 0.97 |
| 4 | 1.55 | 0.07 | 1.46 |
| 5 | 1.75 | 0.03 | 0.99 |

Note:
shape of the sleeve was straight, and length of the fiber stub was 23% longer than that of the optical receptacle according to the present invention. the invention As seen from Table 2, the optical receptacle in FIG. 3, which was assembled according to the above experiment, with the length of the fiber stub 23% shorter than as in FIG. 14 exhibited characteristics similar to a common product, wherein overlapped length of the fiber stub into the holder was even.

Incidentally, we tried to acquire data of insertion loss and variation of the insertion loss under a lateral load of the optical receptacle without such a tiered sleeve as FIG. 3, and with the length of the fiber stub 23% shorter than that of the structure in FIG. 14. But measurements were extremely varied and stable measurements were not obtained. This indicated limitation of downsizing the structure in FIG. 14.

(Experiment 3)

Figure 5:
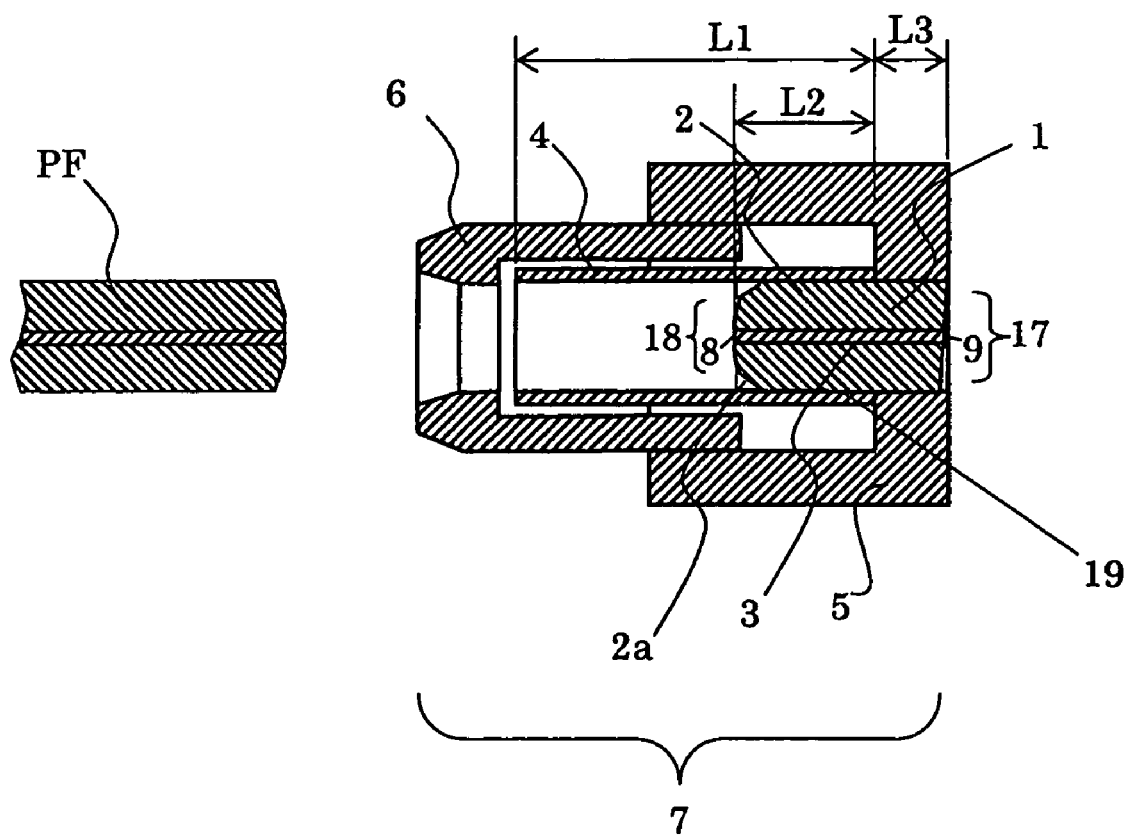
FIG. 5 is a cross-sectional view showing a comparative example of a chamfer with approximately 0.3 to 0.4 mm on the connection side of a plug ferrule.

Third, the optical receptacle, as shown in FIG. 5, with a chamfer face 2a of the fiber stub on the connection side of the plug ferrule being machined as a common ferrule (in case of an LC connector, the chamfer length along the longitudinal direction of the fiber stub being approximately 0.3 to 0.4 mm), was compared to the optical receptacle, as shown in FIG. 3, with a chamfer length thereof being 0.1 mm or below, in variation of insertion loss under a lateral load and variation of reflection attenuation.

Figure 6A:
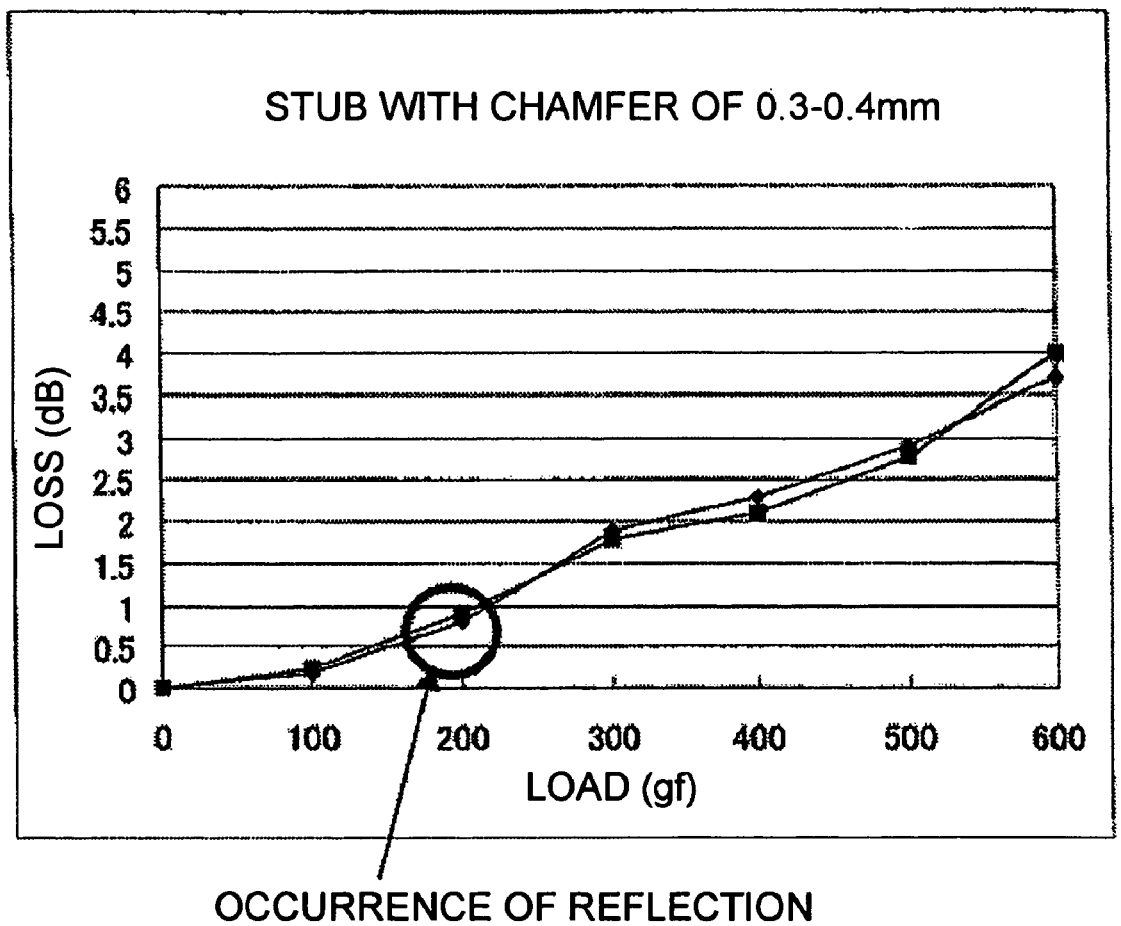
FIGS. 6A and 6B are graphs showing relations between a load on an optical module and connection loss.
Figure 6B:
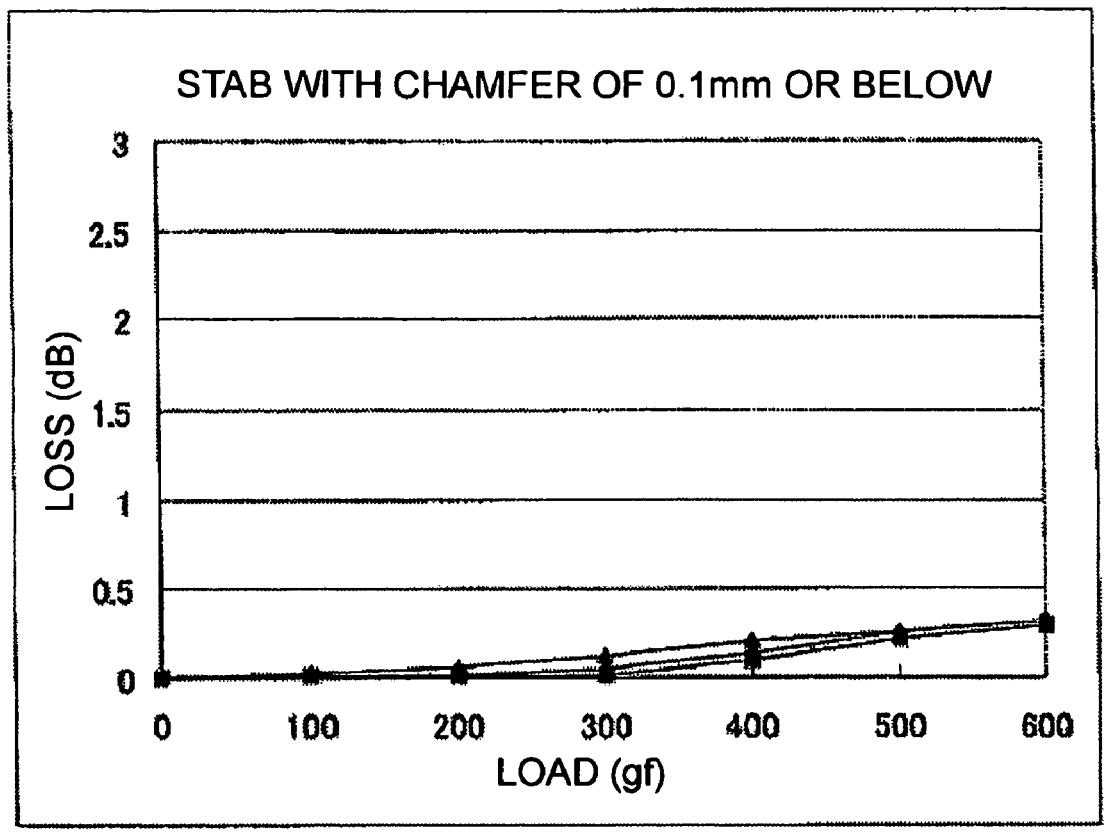

The results are shown in FIGS. 6A and 6B, wherein the horizontal axis shows a load perpendicular to an optical axis, that is, a lateral load, and the vertical axis shows variation of insertion loss in case of an initial value (no loading) being "0."

As seen from FIGS. 6A and 6B, the optical receptacle, the chamfer of which was controlled to 0.1 mm or below, was improved in characteristics under a lateral load in comparison with the optical receptacle having such a chamfer as a common ferrule for a connector. Particularly, in light of reflection attenuation, the optical receptacle having the chamfer of 0.1 mm or below maintained good PC-connection between optical fibers until reaching a load of 600 gf.

Third Embodiment

Figure 7:
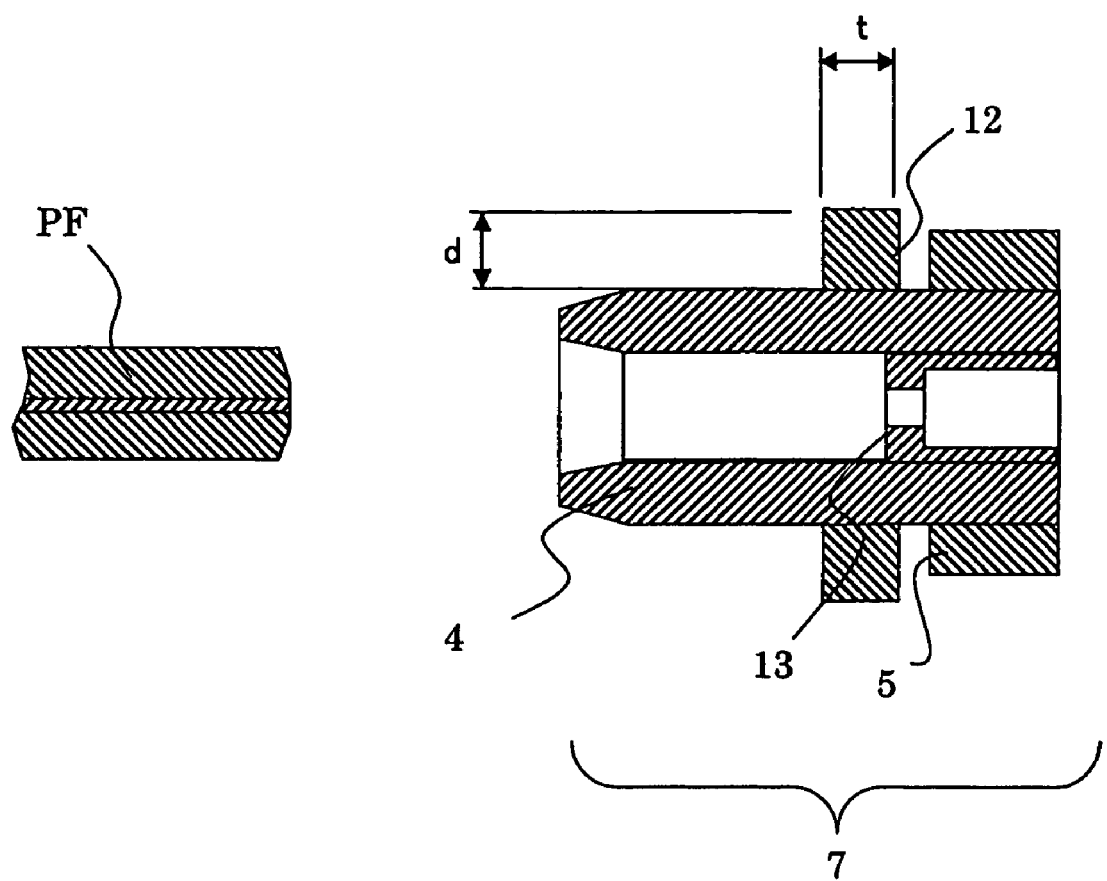
FIG. 7 is a cross-sectional view showing a third embodiment according to the present invention.

FIG. 7 is a cross-sectional view showing a third embodiment according to the present invention. A precision sleeve 4, made of a ceramic material, such as zirconia, alumina, is pressed and fixed into a holder 5, made of stainless steel with good weldability, such as SUS304. A metal flange 12 is fixed by press insertion or adhesives so as not to come in contact with the holder 5. A metal ferrule stopper 13 is pressed and fixed into the inner face of the sleeve 4.

In this structure, the flange 12 and the holder 5 are electrically insulated from each other. In a case of using such an optical receptacle 7 for both of transmission and reception in optical modules used for an optical transmitter and receiver, even when these are fixed together in a metal housing, there is no problem that, electric signals for driving the transmitting optical module may leaked out through the metallic optical receptacle to the metal housing, causing noise on the receiving optical module, and electromagnetic waves may be generated by an antenna composed of the metal sleeve 4 for transmitting, and the metal sleeve for receiving may pick up an external noise, thereby degrading sensitivity for receiving, resulting in excellent noise characteristics.

The above-mentioned ceramic precision sleeve 4 is preferably made of zirconia with high modulus of elasticity, in light of stress relaxation during attachment and detachment and optimization of press insertion. For approaches of machining the sleeve, a molded object to be the sleeve 4, in shape of cylinder or rectangular solid is obtained in advance using a given molding method, such as injection molding, press molding, extrusion molding, and then the molded object is sintered at 1,300 to 1,500 degree-C., followed by cutting or grinding it to predetermined dimensions. Surface roughness of the inner face of the precision sleeve 4 is, in light of insertion, preferably 0.2 µm or below in arithmetic mean roughness (Ra). Tolerances between the outer diameter of the plug ferrule PF and the inner diameter of the precision sleeve 4 is preferably ±1 µm or below to attain lower connection loss.

Since the ferrule stopper 13 is loaded due to repetition of attachment and detachment of the plug ferrule PF or a continuing spring load of the plug ferrule PF during connection, it requires a sufficient fixing strength. This can be realized by approaches for fixing the ferrule stopper 13 into the precision sleeve 4 using sufficient press insertion, or adhesives, or combination of press insertion and adhesives.

The above-mentioned holder 5 is typically welded with a case 22 (See FIG. 12) for an optical module. Therefore, it is made of a weldable material, such as stainless steel, copper, iron, nickel, in particular, stainless steel in light of corrosion resistance and weldability. The metal flange 12 is also preferably plated with, e.g., Ni, on the surface or made of stainless steel, in light of corrosion resistance.

The above-mentioned flange 12 may be fixed so as to be sandwiched between metal chassis or have such a structure as to sandwich a flange portion of chassis, thereby being secured to chassis. This requires a strength sufficient for withstanding a load applied during repetition of attachment and detachment of the plug ferrule PF. Thickness t of the flange 12 is 0.2 mm or more, in case of metal, to ensure sufficient fixing strength, preferably in a range of 0.5 to 2 mm in light of miniaturization and stability of assembly. Radial length d of the flange 12 is preferably in a range of 0.5 to 3 mm. Further, fixed position of the flange 12 is preferably located in the vicinity of a butt position when the head of the plug ferrule PF is inserted.

Furthermore, in the case of FIG. 7, the head of the plug ferrule PF butts against the ferrule stopper 13 to apply a load to this position. Therefore, the flange 12 is fixed as close to the butt position as possible, thereby stably securing the optical receptacle.

In a case of the flange 12 located close to the side of the plug ferrule, there is little degree of freedom in design for a shape of a housing of the plug ferrule. Therefore, the flange 12 is preferably located as close to the side of the holder 5 as possible.

In an optical module including the optical receptacle 7 with a structure in which the above precision sleeve 4 is pressed into the holder and an optical device is fixed to the holder, there is an advantage of suppressing large optical connection loss because the plug ferrule can be positioned within a clearance of the inner diameter of the precision sleeve 4 even in case of being laterally loaded. In addition, the above structure has contours of the optical receptacle 7, coinciding with contours of the precision sleeve, thereby attaining a most miniature and most shortened structure.

Figure 8:
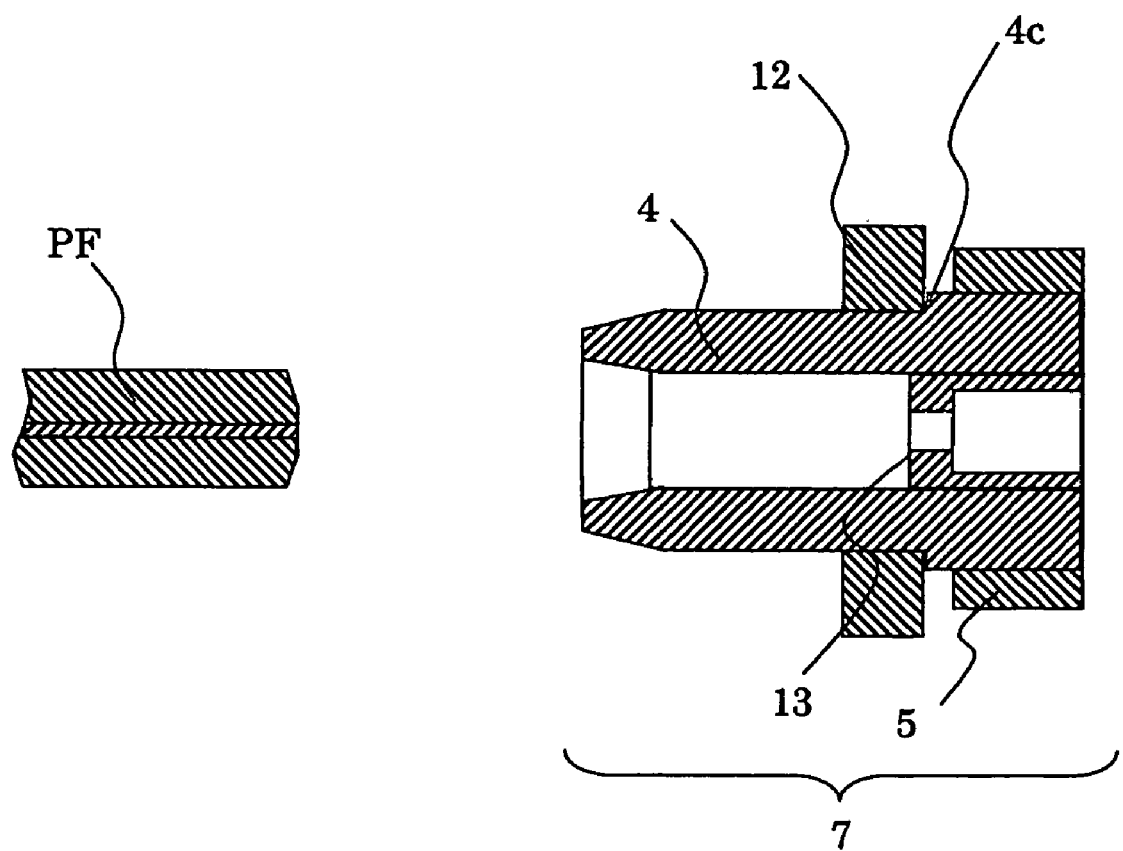
FIG. 8 is a cross-sectional view showing an example of a precision sleeve in FIG. 7 provided with a tier.

FIG. 8 shows a structure easy to position the flange 12, in which the precision sleeve 4 in FIG. 7 is tiered with a tier portion 4c, and the metal flange 12 is fixed onto this tier portion 4c using press insertion or adhesives. If the flange 12 and the precision sleeve 4 may be detached and the flange may move, the flange does not come in contact with the holder 5 and not degrade characteristics of noise.

Figure 9:
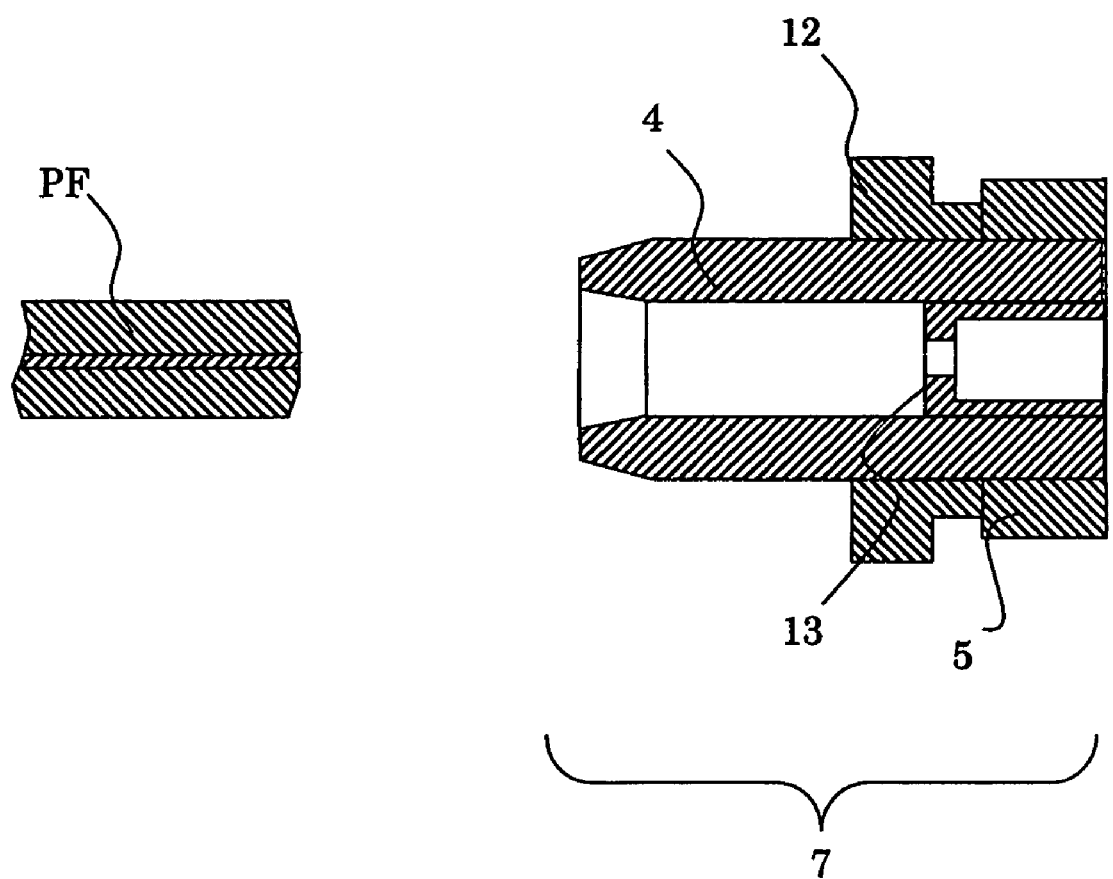
FIG. 9 is a cross-sectional view showing an example of a precision sleeve in FIG. 7 onto which a flange made of an electric insulation material is pressed.

FIG. 9 shows another structure in which the flange 12 made of electric insulation material, such as ceramics, resin, is pressed, occasionally using additional adhesives, onto the precision sleeve 12 in FIG. 7 to contact with the holder 5. In this case, if the flange 12 and the precision sleeve 4 may be detached and the flange may move, the flange does not degrade characteristics of noise.

In the case of the metal flange 12 being pressed and fixed too strongly, there is concern of cracking due to pinching because the large thermal expansion coefficient thereof may prompt shrinking at a lower temperature.

Accordingly, the ceramic flange 12 having a thermal expansion coefficient close to that of the ceramic precision sleeve 4 does not cause cracking due to change of temperature. Meanwhile, a resin flange 12 has no grip force as causing cracking to keep higher safety.

Figure 10:
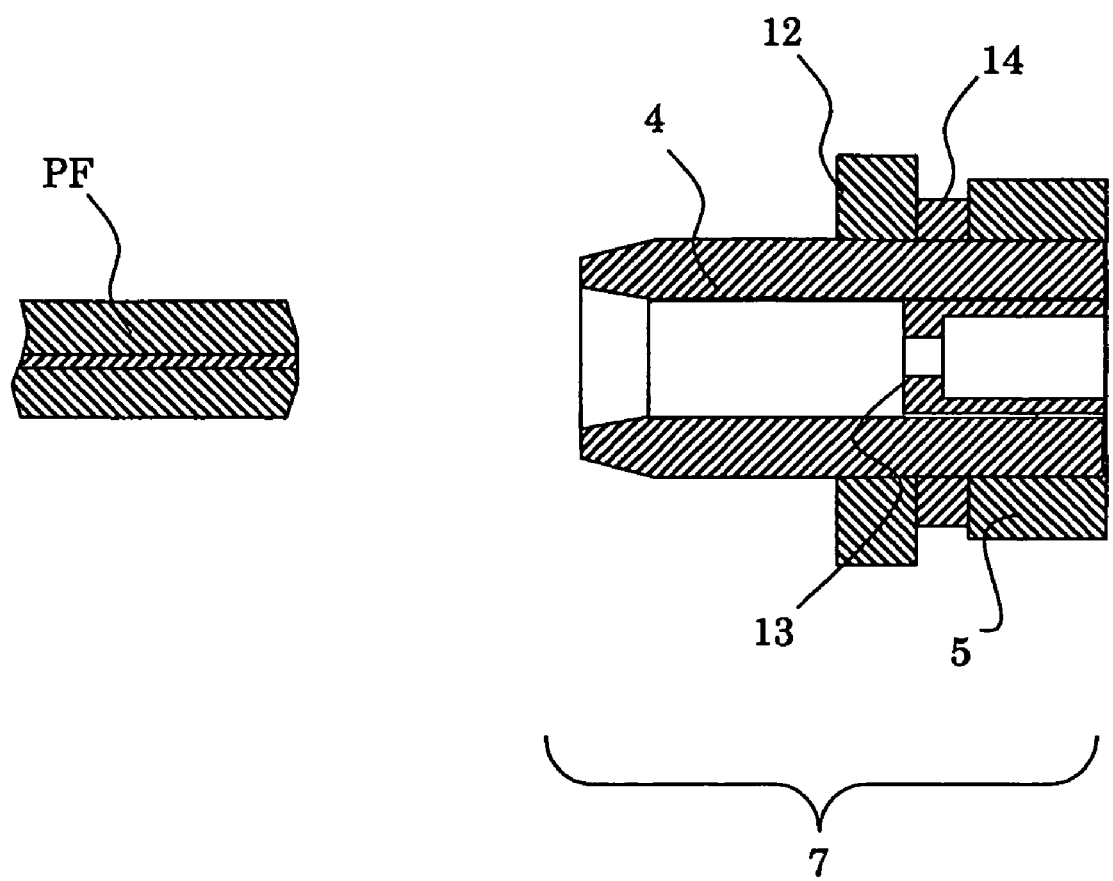
FIG. 10 is a cross-sectional view showing an example of a precision sleeve in FIG. 7 onto which a spacer 14 made of an electric insulation material is interposed.

FIG. 10 shows a structure easy to position the flange 12, in which a spacer 14 made of electric insulation material, such as ceramics, resin, is fitted between the flange 12 in FIG. 7 and the holder 5, and fixed onto the holder 5 using press insertion or adhesives, and then the flange 12 is fixed onto the spacer 14 using press insertion or adhesives. If the flange 12 and the precision sleeve 4 may be detached and the flange may move, the flange does not come in contact with the holder 5 and not degrade characteristics of noise.

Figure 11:
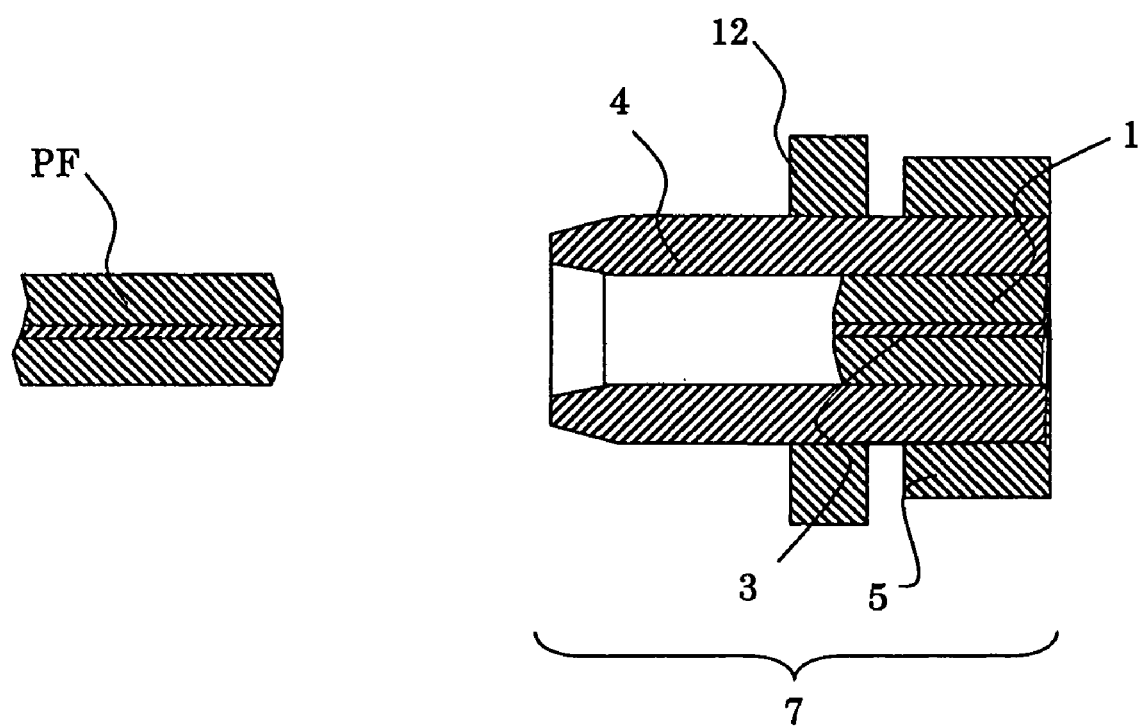
FIG. 11 is a cross-sectional view showing another structural example of an optical receptacle according to the present invention.

FIG. 11 is a cross-sectional view showing another structural example of an optical receptacle according to the present invention.

A fiber stub 1, in which an optical fiber 3 made of fused silica is inserted and fixed into a through-hole of a hollow cylinder made of a ceramic material, such as zirconia, alumina, is pressed and fixed into a precision sleeve 4 made of the same ceramic material.

Then, the outer diameter of the fiber stub 1 is 1 to 7 µm larger than the inner diameter of the precision sleeve 4 into which the fiber stub 1 is pressed. Since the precision sleeve 4 and the fiber stub 1 are made of the same material to coincide with each other in thermal expansion coefficient, a grip force of the precision sleeve 4 for securing the fiber stub 1 is not much changed even when ambient temperature is changed. Therefore, there is no possibility that the fiber stub 1 may move due to the decreased grip force during attachment and detachment of the plug ferrule PF, resulting in large optical connection loss, or the increased grip force may cause deformation or cracking of the precision sleeve 4. As a result, the grip force for the fiber stub 1 can be stabilized.

This precision sleeve 4 is fixed by press insertion to the holder 5, made of stainless steel with good weldability, such as SUS304, at a position where the fiber stub 1 is inserted into the precision sleeve 4, thereby further increasing the holding strength for the stub. This fixing structure of the precision sleeve 4, the fiber stub 1 and the holder 5 can be applied to each flange fixing method as shown in FIGS. 7 to 11. A cylindrical hollow ceramics to be the fiber stub 1 is made of alumina or zirconia, more preferably, zirconia ceramics.

Specifically, partially stabilized zirconia ceramics which mainly has tetragonal crystals, containing a principal component of $ZrO_2$ and a stabilizing material of at least one selected out of $Y_2O_2$, CaO, MgO, $CeO_2$, and $Dy_2O_3$, is preferably used. This partially stabilized zirconia ceramics exhibits excellent wear resistance and appropriate elastic deformation, therefore, with advantages in fixing by press insertion.

For approaches of machining ceramics, in a case of, e.g., zirconia ceramics, a molded object in shape of cylinder or rectangular solid is obtained in advance using a given molding method, such as injection molding, press molding, extrusion molding, and then the molded object is sintered at 1,300 to 1,500 degree-C., followed by cutting or grinding it to predetermined dimensions. Incidentally, the molded object may be cut to predetermined dimensions before sintering. An end face of the fiber stub 1 on side of the plug ferrule is machined in a curved shape with a radius of curvature of approximately 5 to 30 mm to reduce connection loss with an optical connector. Another end face on the side of an optical device is mirror finished with a tilted face having approximately 4 to 10 degree to suppress reflected light which has been emitted from the optical device and then reflected by the end face of the optical fiber, and then returned to the optical device.

This structure including the fiber stub 1 can be obliquely polished as describe above for anti-reflection, in particular, with an advantage in case of using an optical device sensitive to reflection. In this structure of the optical receptacle with anti-reflection, the fiber stub 1 is pressed into the precision sleeve 4, thereby enabling the optical receptacle to be shortened to the utmost limit.

Thus, in the optical receptacle 7 according to the present embodiment, there is an advantage of suppressing large optical connection loss because the plug ferrule PF can be tilted only within a clearance of the precision sleeve even when the plug ferrule is connected to the optical receptacle and then laterally loaded. In addition, the above structure has contours of the optical receptacle 7, coinciding with contours of the precision sleeve. The optical receptacle can be shortened to the utmost limit, and noise characteristics thereof can be improved when used as an optical receptacle for transmitting or receiving, with a metal housing being mounted.

Next, specific examples will be described.

Figure 12:
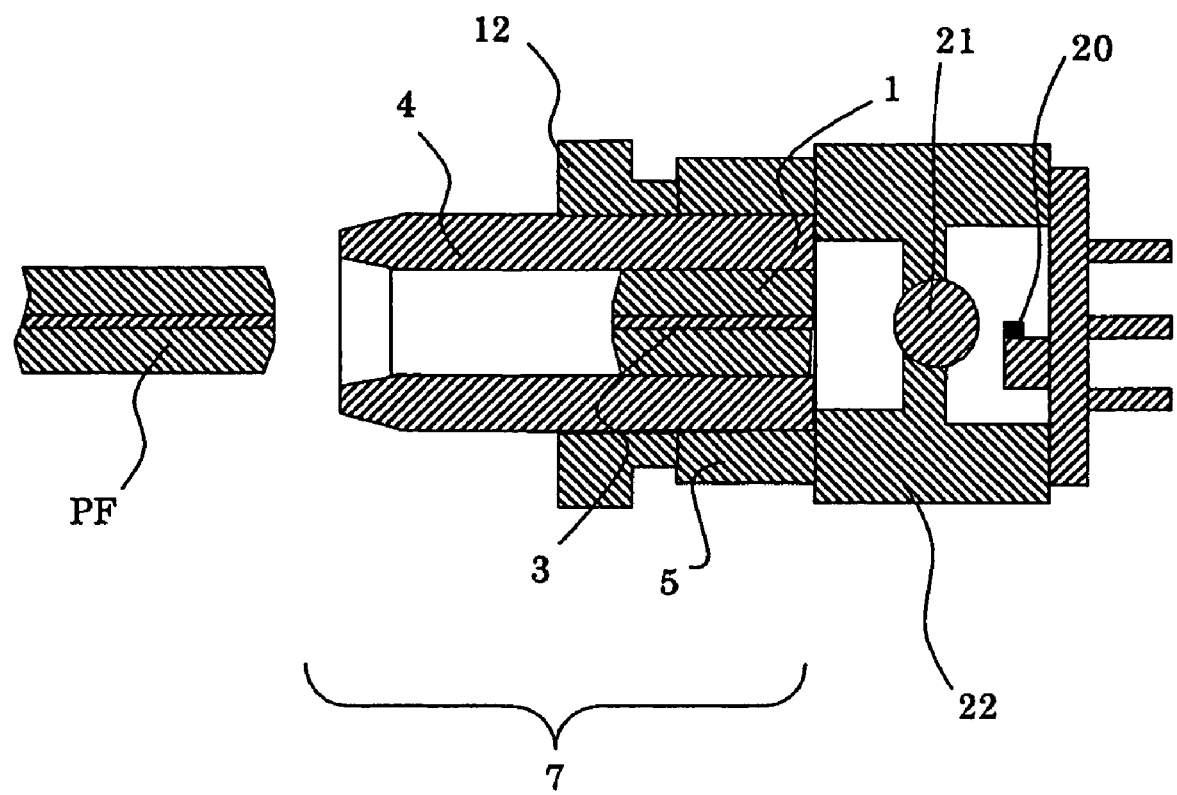
FIG. 12 is a cross-sectional view showing a detailed embodiment.

First, the optical receptacle 7 shown in FIG. 12 for an example was assembled, where an LC connecter was used as an optical connector for the optical receptacle 7. A cylinder hollow ceramics to be the fiber stub 1 was made of zirconia, and such a ceramic molded object in shape of cylinder hollow was obtained by extrusion-molding, followed by sintering and cutting them.

The optical fiber 3 was inserted and fixed using adhesives into the through-hole of each of the resulting cylindrical ceramics, and then the front end was mirror finished to a curved face with a radius of curvature of approximately 20 mm. The opposite end was mirror finished with a tilted face having 8 degree, to suppress reflected light which has been emitted from the optical device 20, such as LD, and then reflected by the front face of the optical fiber 3, and then returned to the optical device 20, resulting in the fiber stub 1.

The precise sleeve 4 made of zirconia ceramics was polished from the insertion opening for the fiber stub 1 within a range shorter than the fiber stub 1, so that the inner diameter thereof was approximately 1 to 7 μm smaller than the outer diameter of the fiber stub 1. The remaining portion had a clearance of 1 μm or below with respect to the outer diameter of the fiber stub 1.

Further, the precision sleeve 4 was grooved along the insertion direction of the plug ferrule for purposes of easy press insertion and air-bleeding during inserting the plug ferrule. The fiber stub 1 was pressed into this precise sleeve 4 using a handpress equipped with a pressure sensor while confirming a sufficient load. At this time, the press insertion load was approximately 150 N around the fixed position of this sample.

Therefore, the fiber stub 1 could not move on condition with such a load or below, and obviously attained sufficient strength against spring pressure of the plug ferrule PF and impact during attachment or detachment.

Next, the precision sleeve 4 was pressed and fixed into the holder 5, made of SUS304 with good weldability, on the side of the fiber stub 1 being pressed in. This was also pressed in using a handpress equipped with a pressure sensor while confirming a sufficient load. The press insertion load was approximately 130 N around the fixed position of this sample. Next, the flange 12 made of resin was pressed in and reinforced using adhesives, resulting in the optical receptacle 7.

Thus, the optical receptacle having a shortened and insulated structure in which a length of the precision sleeve 4 is 6.35 mm was completed. Since the distance from the front end of the optical receptacle 7 to the front end of the fiber stub for positioning the plug ferrule PF was designed to 4.05 mm, the fiber stub 1 had a length of 2.3 mm. If designing the shortened optical receptacle having 6.35 mm under a conventional insulated structure, in a case the distance from the front end of the optical receptacle 7 to the front end of the fiber stub for positioning the plug ferrule PF is designed to 4.05 mm, the fiber stub 1 will have a length of 2.3 mm similarly to above.

Figure 13A:
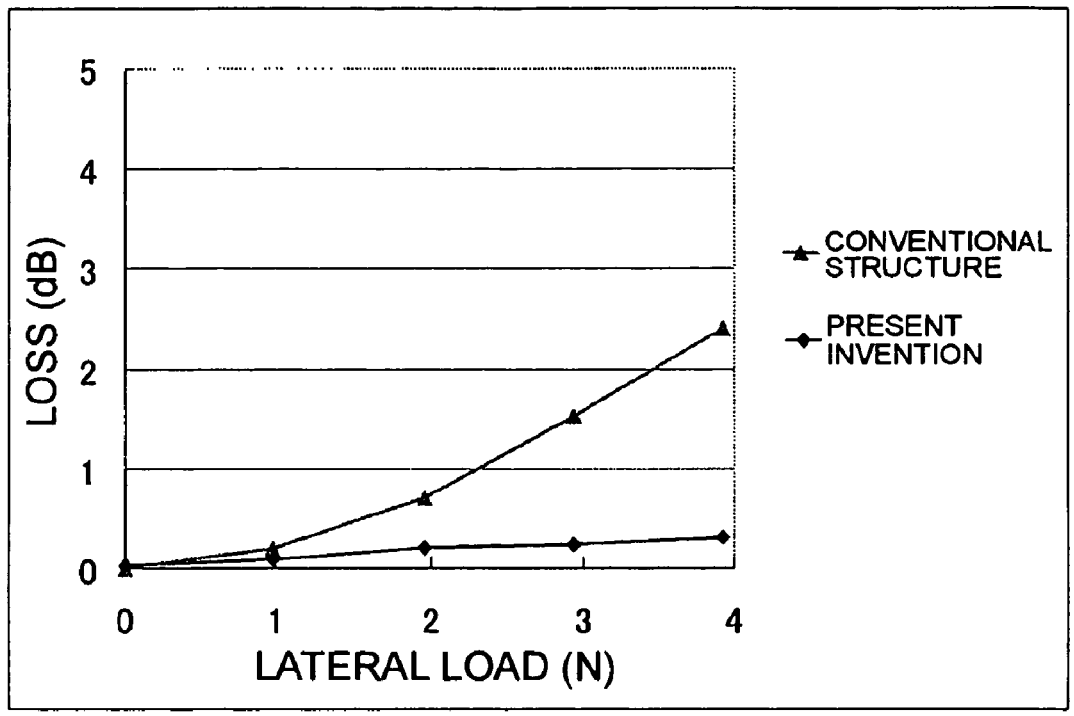
FIG. 13A is a graph showing connection loss versus lateral load in both cases of a precision sleeve and a split sleeve.

Meanwhile, in another case where the insertion length of the fiber stub 1 into the holder 5 was 0.3 mm, i.e., too short and insufficient for the fixing strength of the fiber stub 1, and the insertion length of the fiber stub 1 into the split sleeve 4 was 2 mm, i.e., as long as possible, the result of lateral load characteristics is shown in FIG. 13A, comparing with the result of lateral load characteristics according to the present invention.

Figure 13B:
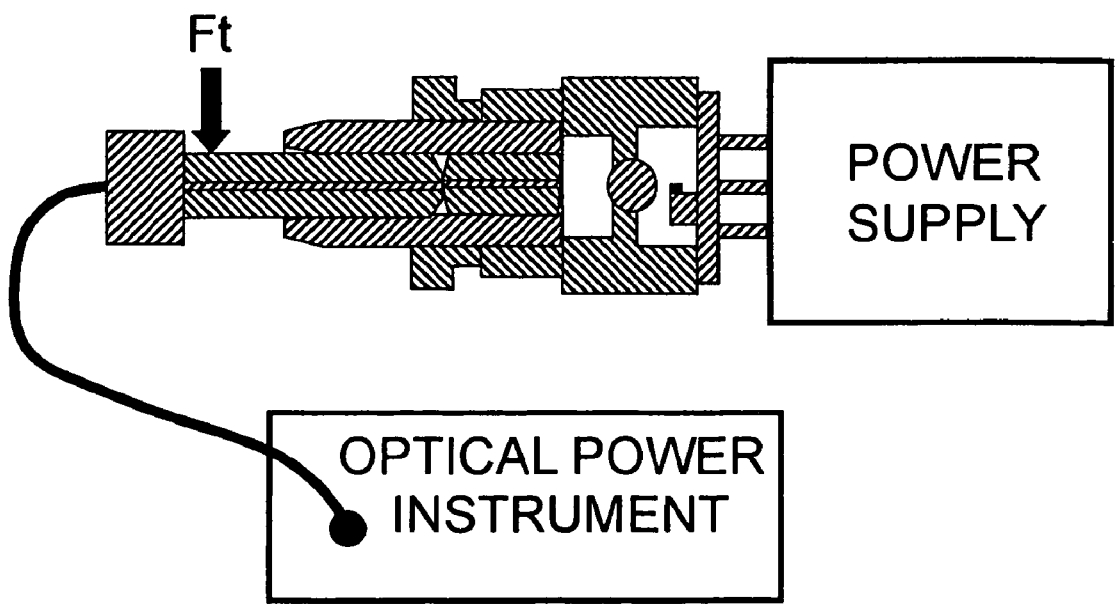
FIG. 13B is an explanatory view showing a measurement of connection loss versus lateral load.

Measurement of a lateral load is shown in FIG. 13B, wherein a module including the optical receptacle and an LD device welded thereto generated constant light using a power supply, and then the plug ferrule was inserted to make a connection, and then the optical power therefrom was measured using an optical power instrument. Next, the optical power versus lateral force F was measured with a criterion of the optical power without the lateral load.

These experimental results are shown in FIG. 13A, from which it could be obviously seen that the present invention was more excellent in characteristics of lateral loading, and more advantageous in downsizing.

INDUSTRIAL APPLICABILITY

The present invention can be applied to an optical communication module or the like, as well as an optical module used for a sensor.

The invention claimed is:

1. An optical receptacle comprising:
   a fiber stub;
   a holder directly fixing the fiber stub; and
   a sleeve into which the fiber stub is inserted, having a thicker portion directly holding the fiber stub;
   wherein the thicker portion has an outer surface of a periphery of the thicker portion not contacting with the holder.

2. The optical receptacle according to claim 1, wherein a length of the thicker portion of the sleeve is shorter than an insertion length of the fiber stub.

3. The optical receptacle according to claim 1, wherein the thicker portion is 1.5 to 2.5 times as thick as the other portion.

4. The optical receptacle according to claim 3, wherein the thicker portion has an inner diameter equal to that of the other portion and an outer diameter larger than that of the other portion.

5. The optical receptacle according to claim 1, wherein chamfer of a corner around a front end of the fiber stub is 0.1 mm or below.

6. An optical receptacle comprising:
   a ceramic precision sleeve for holding a plug ferrule, having an outer surface of its periphery;
   a metal holder provided at a rear end of the outer surface of the precision sleeve, and;
   a metal flange provided on the outer surface of the precision sleeve separately from the metal holder.

7. The optical receptacle according to claim 6, wherein a stub, which includes a ceramic ferrule of the same material as the precision sleeve and an optical fiber being inserted and held in the ferrule, is pressed and fixed into the precision sleeve.

8. The optical receptacle according to claim 6, wherein the metal flange is electrically insulated from the metal holder.

* * * * *